United States Patent
Swanson et al.

(10) Patent No.: US 11,635,889 B1
(45) Date of Patent: Apr. 25, 2023

(54) DYNAMIC GRAPHICAL USER INTERFACES FOR DISPLAYING INTER-APPLICATION COMMUNICATIONS WITH A DYNAMIC SEGMENTATION-BASED MOBILE OFFER PLATFORM

(71) Applicant: Ibotta, Inc., Denver, CO (US)

(72) Inventors: Luke Swanson, Denver, CO (US); Garrick Wager, Arvada, CO (US); Daniel Smoker, Castle Rock, CO (US)

(73) Assignee: Ibotta, Inc., Denver, CO (US)

( * ) Notice: Subject to any disclaimer, the term of this patent is extended or adjusted under 35 U.S.C. 154(b) by 0 days.

(21) Appl. No.: 16/127,810

(22) Filed: Sep. 11, 2018

Related U.S. Application Data

(60) Provisional application No. 62/659,224, filed on Apr. 18, 2018, provisional application No. 62/597,834, filed on Dec. 12, 2017, provisional application No. 62/556,651, filed on Sep. 11, 2017.

(51) Int. Cl.
| | |
|---|---|
| *G06F 3/048* | (2013.01) |
| *G06F 3/04886* | (2022.01) |
| *G06Q 30/0207* | (2023.01) |
| *G06F 3/0484* | (2022.01) |
| *G06F 16/957* | (2019.01) |

(52) U.S. Cl.
CPC ........ *G06F 3/04886* (2013.01); *G06F 3/0484* (2013.01); *G06F 16/9577* (2019.01); *G06Q 30/0239* (2013.01)

(58) Field of Classification Search
CPC ............ G06Q 30/0239; G06Q 30/0224; G06F 3/04886; G06F 16/9577; G06F 3/0484
See application file for complete search history.

(56) References Cited

U.S. PATENT DOCUMENTS

| | | | |
|---|---|---|---|
| 2002/0120627 A1* | 8/2002 | Mankoff | G06Q 10/10 |
| 2013/0085807 A1* | 4/2013 | Cincotta | G06Q 30/0203 |
| | | | 705/7.32 |
| 2015/0149452 A1* | 5/2015 | Warner | G06F 16/248 |
| | | | 707/725 |
| 2017/0068982 A1* | 3/2017 | Vangala | G06Q 30/0224 |
| 2017/0148046 A1* | 5/2017 | Akbarpour Mashadi | |
| | | | G06Q 30/0239 |
| 2021/0125262 A1* | 4/2021 | Corrieri | G06Q 30/0601 |

* cited by examiner

*Primary Examiner* — Aleksey Olshannikov
(74) *Attorney, Agent, or Firm* — Wilson Sonsini Goodrich & Rosati

(57) ABSTRACT

Provided are dynamic graphical user interfaces for facilitating inter-application communications, such as in a mobile device. The dynamic graphical user interface can display simultaneously: a web-based interface of a mobile browser application for receiving one or more user actions on the web-based interface; and an interactive display in communication with a second mobile application different from the mobile browser application, wherein the interactive display dynamically presents, in real-time, a status or output of the second mobile application in response to the one or more user actions performed on the web-based interface, and wherein the interactive display is visible during performance of the one or more user actions on the web-based interface.

20 Claims, 19 Drawing Sheets

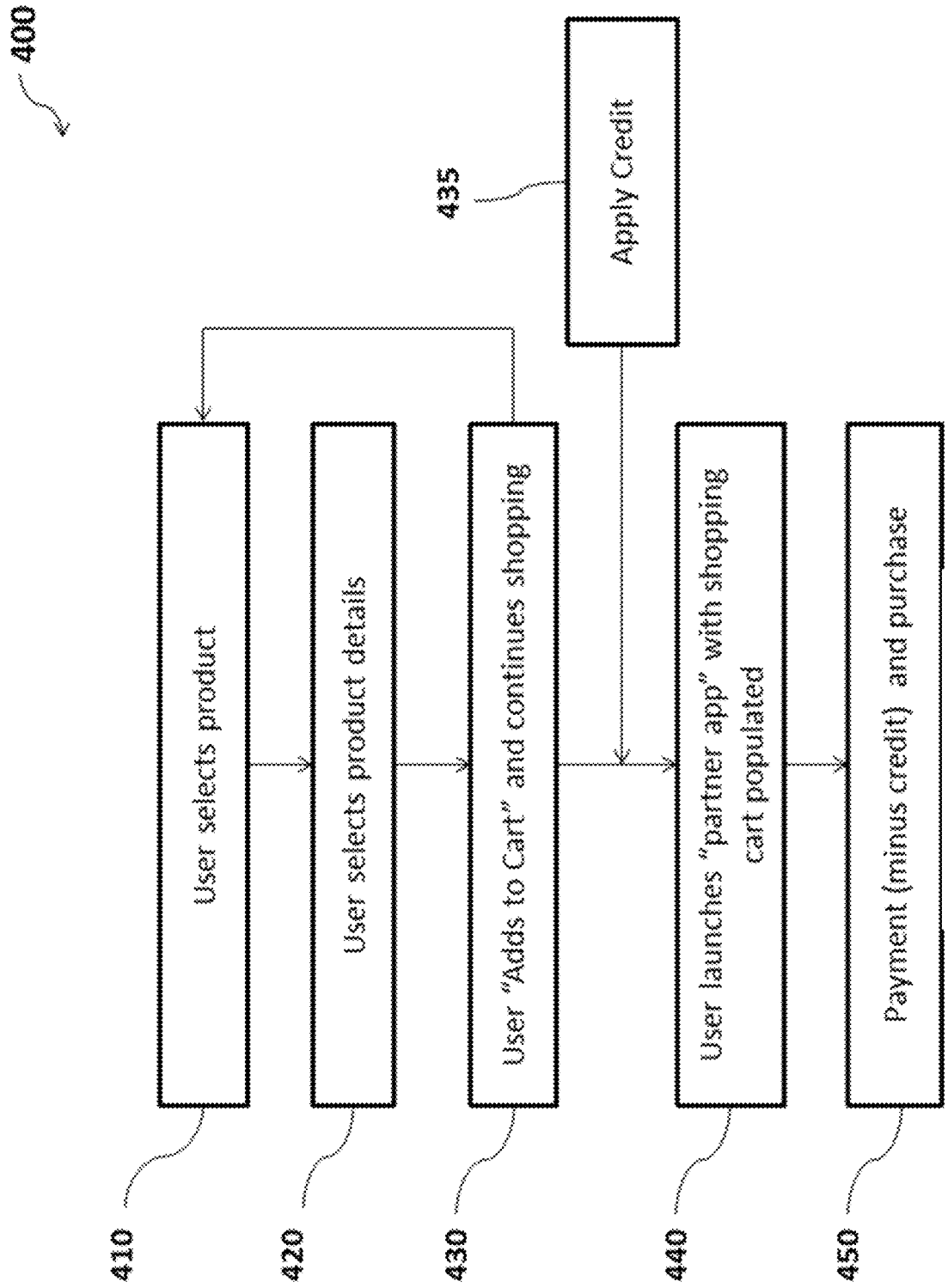

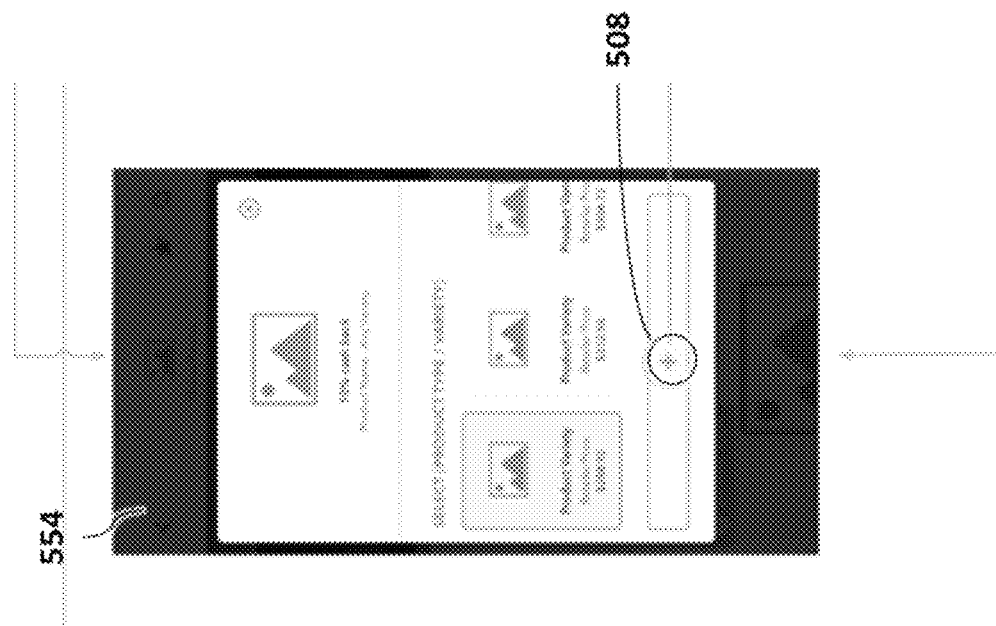
FIG. 5A(ii)

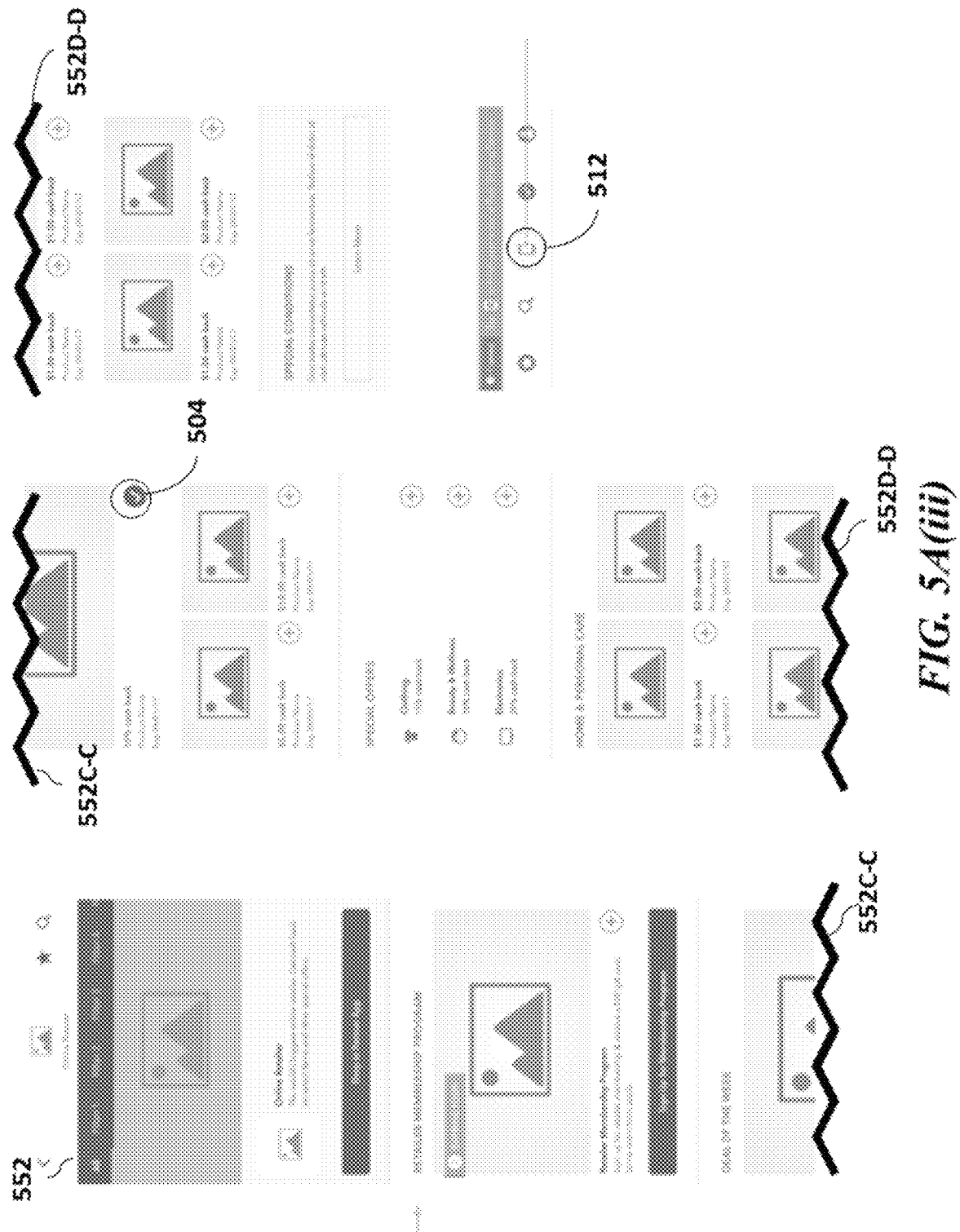

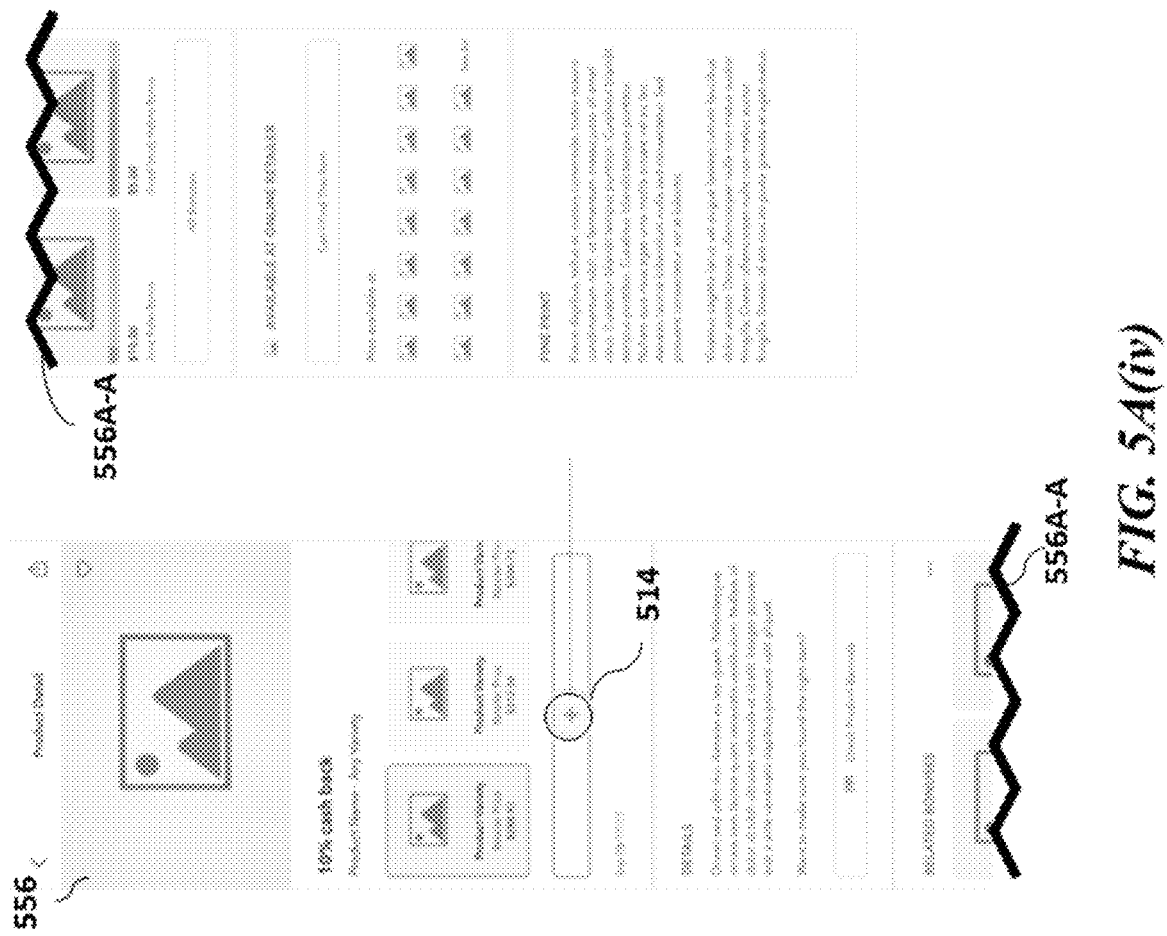
FIG. 5A(iv)

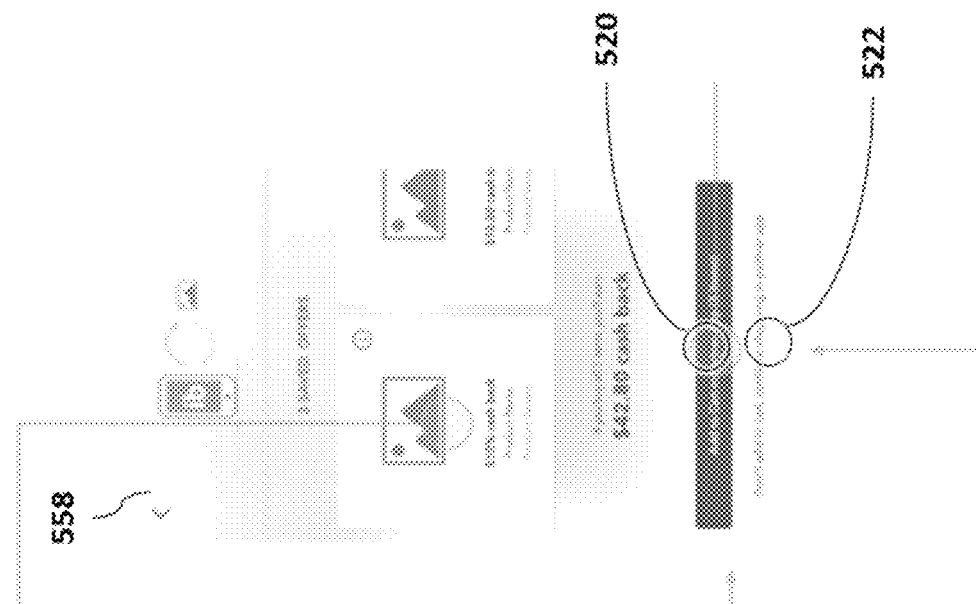
FIG. 5A(vi)

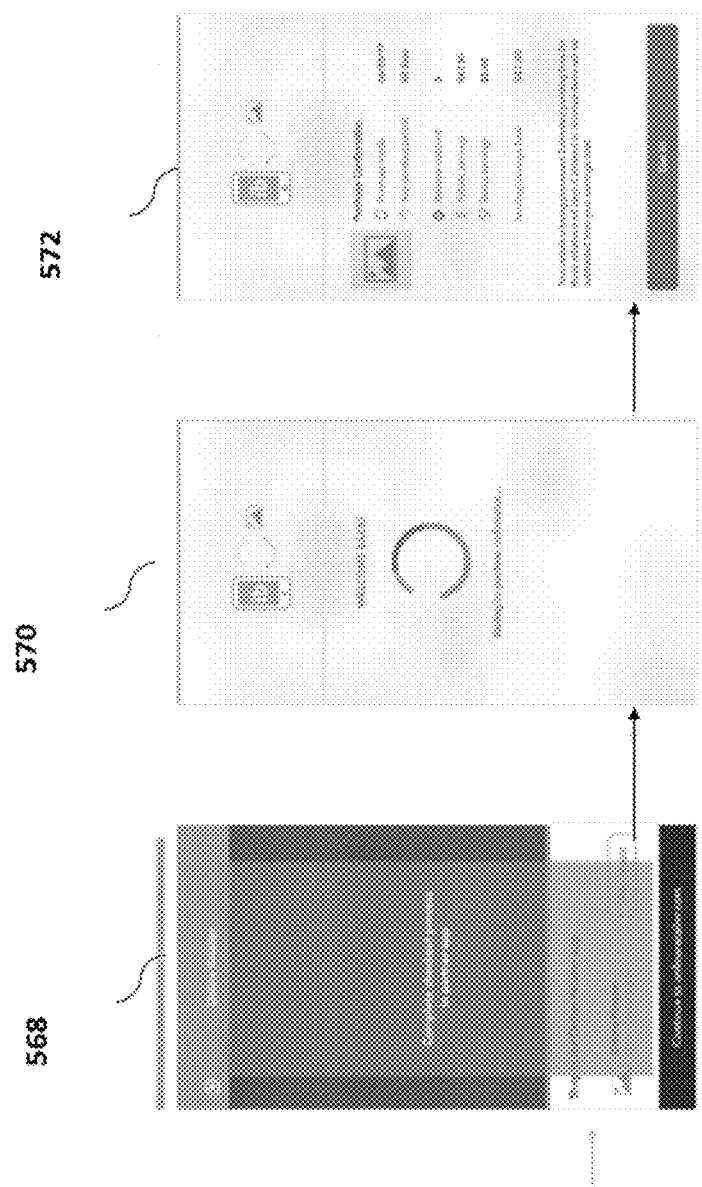
FIG. 5B(ii)

DYNAMIC GRAPHICAL USER INTERFACES FOR DISPLAYING INTER-APPLICATION COMMUNICATIONS WITH A DYNAMIC SEGMENTATION-BASED MOBILE OFFER PLATFORM

CROSS-REFERENCE

This application claims the benefit of U.S. Provisional Application No. 62/556,651, filed Sep. 11, 2017, U.S. Provisional Application No. 62/597,834, filed Dec. 12, 2017, and U.S. Provisional Application No. 62/659,224, filed Apr. 18, 2018, each of which application is entirely incorporated herein by reference.

BACKGROUND

With the advent of smartphones and other wireless handheld devices, an increasing number of retailers have started introducing mobile applications as an additional channel to reach customers. More browsing, buying, and selling of products and services is happening on mobile devices, and retailers are increasingly offering standalone mobile applications customized for an enhanced mobile shopping experience. Digital offers have also been gaining wide popularity, and businesses are increasingly partnering with mobile and digital offer delivery platforms to attract customers and increase sales. The easier it becomes to use and apply mobile and digital offers across a wide number of mobile platforms and applications, the better the mobile shopping experience can be for customers.

SUMMARY

Recognized herein is the need to provide mobile offer platforms which can deliver highly customized mobile promotions or offers to customers, while minimizing the need for customers to switch across multiple different mobile shopping applications. Systems and methods described herein provide retailers, advertisers, and other participating entities with an online/mobile platform configured to deliver dynamically segmented offers to customers, and track relevant advertising performance metrics, while providing deep linking to various specific web content or other mobile applications. Consequently, users are provided with a mobile offer platform containing customized offers, which can be conveniently used or applied across multiple different retailers or businesses.

In an aspect, provided is a computing device configured to display on a user interface of a user device, a dynamic graphical user interface, the dynamic graphical user interface displaying simultaneously: a web-based interface of a mobile browser application for receiving one or more user actions on the web-based interface; and an interactive display in communication with a second mobile application different from the mobile browser application, wherein the interactive display dynamically presents, in real-time, a status or output of the second mobile application in response to the one or more user actions performed on the web-based interface, and wherein the interactive display is visible during performance of the one or more user actions on the web-based interface.

In some embodiments, the status or output comprises a predicted outcome of the one or more user actions in the second mobile application.

In some embodiments, the status or output comprises a list of options in the second mobile application available for user selection. In some embodiments, user selection of a given option from the list of options in the interactive display translates to user selection of the given option in the second mobile application without departing the web-based interface.

In some embodiments, the interactive display is visible prior to or subsequent to performance of the one or more user actions on the web-based interface. In some embodiments, the interactive display is visible at all times during launch of the web-based interface.

In some embodiments, the status or output presented in the interactive display updates, in real-time, in response to a first subset of user actions performed in the web-based interface and does not update in response to a second subset of user actions performed in the web-based interface.

In some embodiments, the interactive display is presented as a header in the web-based interface.

In some embodiments, the interactive display is presented as a floating window or pop-up in the web-based interface.

In some embodiments, the interactive display is communicatively linked to the second mobile application via an external server providing the interactive display.

In another aspect, provided is a computing device configured to display on a user interface of a user device, a dynamic graphical user interface, the dynamic graphical user interface displaying simultaneously: an application interface of a first mobile application for receiving one or more user actions on the application interface; and an interactive display in communication with a second mobile application different from the first mobile application, wherein the interactive display presents, in real-time, a status or output of the second mobile application in response to the one or more user actions, and wherein the interactive display is visible during performance of the one or more user actions on the application interface.

In some embodiments, the status or output comprises a predicted outcome of the one or more user actions in the second mobile application.

In some embodiments, the status or output comprises a list of options in the second mobile application available for user selection. In some embodiments, user selection of a given option from the list of options in the interactive display translates to user selection of the given option in the second mobile application without departing the application interface.

In some embodiments, the interactive display is visible prior to or subsequent to performance of the one or more user actions on the application interface. In some embodiments, the interactive display is visible at all times during launch of the application interface.

In some embodiments, the status or output presented in the interactive display updates, in real-time, in response to a first subset of user actions performed in the application interface and does not update in response to a second subset of user actions performed in the application interface.

In some embodiments, the interactive display is presented as a header in the application interface.

In some embodiments, the interactive display is presented as a floating window or pop-up in the application interface.

In some embodiments, the first mobile application is communicatively linked to the second mobile application via deep linking.

In another aspect, disclosed herein is a computer-implemented method for automatically crediting an item of value to users on a first mobile application based on purchase data on a second mobile application. The method may comprise: (a) receiving, on the first mobile application, one or more offers customized for a user; (b) receiving, by the first mobile application, a user input on an item of interest associated with the one or more offers, thereby initiating a launch process of a second mobile application, wherein the second mobile application is associated with the item of interest; (c) generating, by the first mobile application, a unique token which identifies the launch of the second mobile application and registering the launch with a first server system associated with the first mobile application; (d) launching the second mobile application, wherein the item of interest includes a deep link to specify a page to open in the second mobile application, which page displays the item of interest; (e) transmitting, to the first server system, a purchase notification which is generated once the user makes a purchase of the item of interest; (f) applying a matching algorithm to determine an item of value among the one or more offers; (g) receiving, from the second mobile application or a second server system associated with the second mobile application, a purchase finalization webhook; and (h) automatically crediting the user with the item of value.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 4 illustrates a block diagram for payments and offer redemption for the mobile offer platform;

FIGS. 5A(i)-(vi) are each enlargements of sections of FIG. 5A. FIGS. 5B(i)-(ii) are each enlargements of sections of FIG. 5B;

DETAILED DESCRIPTION

Figure 1A:
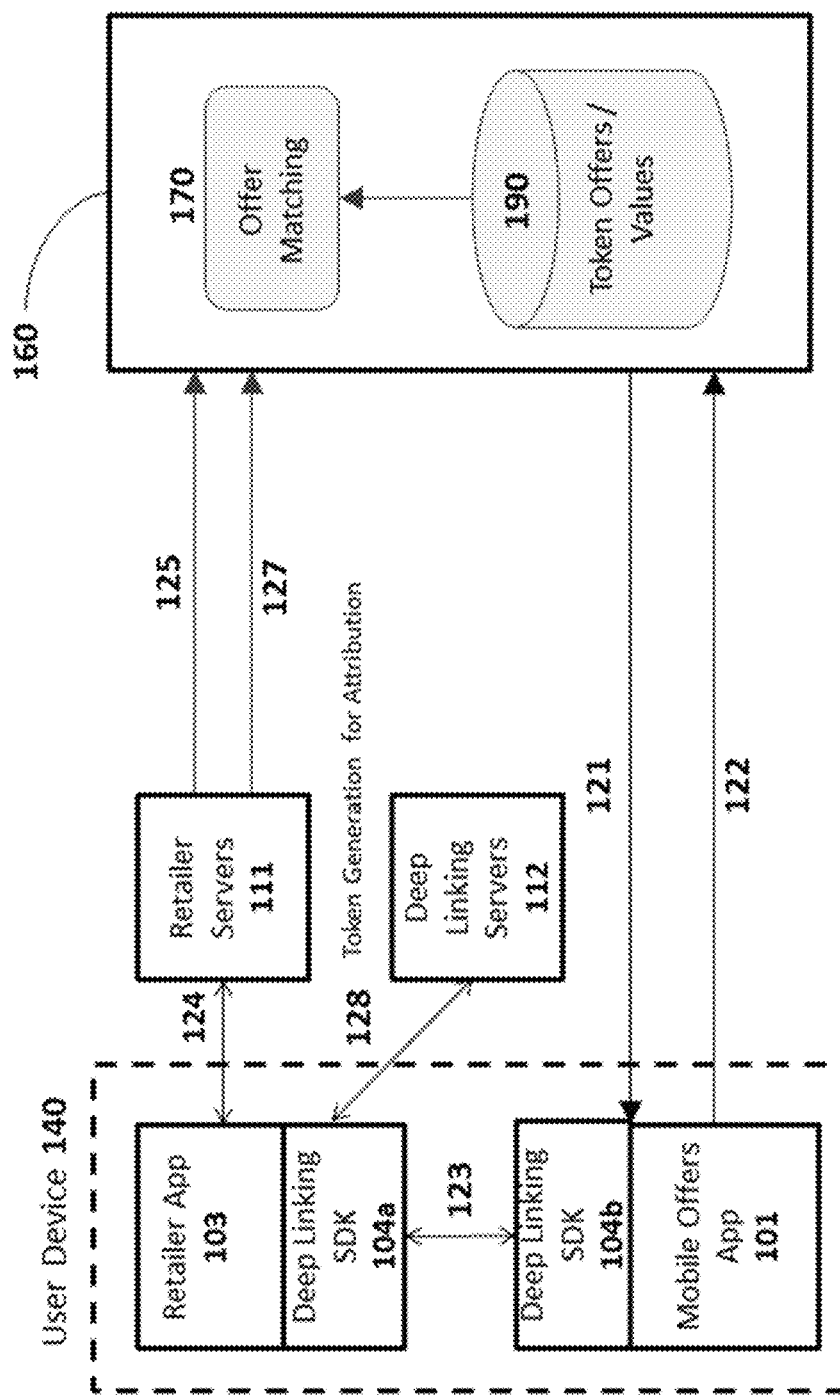
FIG. 1A illustrates an environment for a mobile offer platform.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Often, to complete a desired action, a user must navigate between two or more different applications. For example, when the user is using or applying data (or other information) obtained from a first application in a second application, the user may have to enter the first application, exit the first application, enter the second application, and exit the second application however many times as required to confirm and complete the action. Such broken user experience may be confusing and cumbersome for the user. Furthermore, data may be miscommunicated during the transitions.

Recognized herein is a need to address the abovementioned problems. The present disclosure provides systems and methods for integrated inter-application communications in a user device (or between different user devices), as well as intuitive, dynamic graphical user interfaces for displaying a status or output of such inter-application communications. Beneficially, the dynamic graphical user interfaces may display, in real-time, a response of a second application in response to a user action performed in a first application. For example, the dynamic graphical user interface may display, in real-time, a user's predicted outcomes in the first application based on user actions performed in the second application. Beneficially, the real-time response may be displayed to the user at all times during regular application operations in the first application such that the user is made aware of the consequences (and predicted outcomes) of the user action in real-time.

As used herein, the term "real-time" may generally refer to an instantaneous or substantially instantaneous response time. For example, the response time for a "real-time" event may be less than a second, a tenth of a second, a hundredth of a second, a millisecond or less. In some instances, "real-time" may also refer to a simultaneous or substantially simultaneous occurrence of a first event (e.g., dynamic display of a status in a first application) relative to a second event (e.g., user action in a second application).

While some examples of user devices are provided throughout the disclosure, such as mobile devices, any other user device may be used, such as stationary (or substantially stationary) devices (e.g., desktop computers) or non-portable devices or any other device operating a computer system and capable of providing a user interface. Further, while some examples of application user interfaces are provided throughout the disclosure, such as mobile application interfaces (e.g., for native applications residing on mobile devices) and web-based application interfaces, an "application interface" or "application user interface," as used herein may generally be substituted for and/or used in conjunction with any suitable graphical application interface, such as mobile device-based application interfaces (e.g., mobile application interfaces, mobile browser interfaces, etc.), desktop-based application interfaces (e.g., desktop application interfaces, desktop browser interfaces, etc.), web-based interfaces, and the like.

Mobile Offer Platform and Application

FIG. 1A illustrates an environment for a mobile offer platform. The environment may include a user device 140, mobile offer platform 160, and retailer servers 111. The components, devices, or systems in the environment may be communicatively coupled via a network. The number of user devices and retailers, retailer servers are for illustrative purposes (e.g., FIG. 1A only shows one user device) only and can be increased to include multiple user devices, multiple retailers, and multiple retailer servers.

User device 140 may be a mobile device (e.g., smartphone), handheld device, desktop computer, laptop computer, netbook, electronic tablet or similar device, networking device, personal digital assistant, wearable device, head mounted computer or display, or any other device, component, module, subsystem or system capable of processing electronic data, or any combination thereof. In some embodiments, the user device 140 may be a smartphone with a mobile application installed, and the mobile application may be configured to download and display offers. The user device may also be configured to be communicatively coupled to the mobile offer platform 160 and may transmit data related to the user, including information related to the user device (e.g., device ID). In some embodiments, the mobile offer application 101 and the mobile offer platform 160 may form a client-server architecture, wherein the mobile offer platform acts as a server (i.e., back end) and the mobile offer application 101 (i.e., front end) acts as a client.

The user device 140 may include one or more mobile applications installed on the system. The mobile offer application 101 may be associated with the mobile offer platform 160. The mobile offer application 101 may be configured to display one or more pieces of information transmitted or obtained by the mobile offer platform 160. Such information may include offer, coupon, or rebate information, user information, product information, purchase history, links to other mobile applications, payment information, and the like.

The retailer application 103 may also be installed on the user device 140. The retailer application 103 may represent a single retailer or can represent multiple different retailers. The retailer application 103 may be configured to communicate with the retailer servers 111. There can be multiple retailer applications installed on the user device, wherein each retailer application can be associated with a retailer, service providers, or any other businesses.

The retailer servers 111 can be configured to communicate with the retailer application, and provide necessary information to display and render relevant information on the retailer application 103. For example, the retailer application may be configured to display one or more product information and any other information relevant to products or purchase of products. In some instances, the retailer servers 111 can be configured to communicate with the mobile offer application 101, such as to provide necessary information to display and render relevant information on the mobile offer application 101. In some instances, the retailer servers 111 may be accessed from within the mobile offer application 101 via an interface (e.g., browser application, web interface, etc.). In some instances, the retailer servers 111 may be accessed external to the mobile offer application 101 via an interface. The interface may be a mobile interface, such as a mobile web interface.

The mobile offer platform 160 can comprise offer matching module 170 and a database for storing tokens, offers and values 190. For example, tokens in this context can be a unique identifier corresponding to an invocation of the third party application 103 by the mobile offers app 101. The mobile offer platform may be configured to store offers and the values of the offers available to the user with the aforementioned tokens, such that the platform can be configured to determine what the user had available when they had launched the third party application (e.g., retailer app 103). The mobile offer platform 160 can then evaluate the user's purchases against those offers. The mobile offer platform 160 may be configured to provide one or more pieces of relevant information to the mobile offer application 101. The mobile offer platform 160 can be communicatively coupled to the retailer servers 111 and the user device 140 in order to obtain and transmit relevant information, including customized offers for users, purchase information, matched offers, payment information, and the like.

The mobile offer platform 160 may be configured to provide dynamic segmentation of offers. The mobile offer platform 160 may comprise a dynamic segmentation module, which may be configured to apply one or more algorithms to data stored in various databases of the mobile offer platform 160. The databases may include, but are not limited to, a segment database, rule database, user database, and offer database, in order to determine whether a specific offer should be presented to a specific user device 140 or the user associated with the user device. In some embodiments, offers for each segment are selected according to the rule data, and the dynamic segmentation module may be configured to present the users with offers according to their associated segments, based on the segment data. Additionally or alternatively, offers can be further tailored to the user based on the user's segment. For example, the value of the offer can be adjusted based on the user's associated segment. In another example, the image of the offer can be adjusted or modified based on the user's associated segment.

Segments may be based on one or more differentiators that divide customers or potential customers in a given market into groups. Information such as customers' demographics (age, race, religion, gender, family size, ethnicity, income, education level), geography, behavioral tendencies, purchase history may serve as bases or variables for determining customer segmentation.

For example, the segment data may comprise: 1) a segment or segments to which a customer has been assigned to, and 2) an identifier for the customer (e.g., hash of a customer's email). Segments may be based on geographic segmentation (based on country, region, population density, city size, etc.), demographic segmentation (based on age, gender, occupation, social class, marital status, income, etc.), psychographic segmentation (based on values and lifestyle), behavioral segmentation (based on purchase history, benefit-sought, user status, usage rate/purchase frequency, loyalty status, buyer readiness, attitude to produce or service, etc.), generational or cultural segmentation. Identifiers for the customer may include, but is not limited to, a hash of the customer's email address or other contact information, Identifier for Advertising (IDFA), Google Advertising ID (AAID), Unique Device Identifier (UDID), and the like.

These components of the various systems described herein are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 1A, the mobile offer platform 160, for example, can include more components or can combine the components into fewer components (such as a single component), as may be desirable for a particular implementation. One or more of the components can be implemented by a user device. The interactions among these components are illustrated in detail below.

Each component of the mobile offer platform 160 may be implemented using one or more computing devices (e.g., server devices) including at least one processor executing instructions that cause the mobile offer platform 160 to perform the processes described herein. The various components of the mobile offer platform 160 listed above can be implemented by a single server device or across multiple server devices, as described above.

The one or more components, devices, or systems described above may be configured to communicate with one or another based on the following algorithm: as a first step, the mobile offer application 101 may fetch personalized, customized content from the mobile offer platform 160 (process 121). The content may be based on applying the aforementioned dynamic segmentation algorithm, in order to determine which offers can be appropriate for the specific user. The content may also be recommended for the customer based on demographics, past purchase behavior gathered from the mobile offer platform's 160 record of offline purchase behavior. The customer's offline purchase behavior can be obtained, for example, by ingesting data from one or more offline retailers or via the mobile offer application 101. For example, the user may scan the offline receipt using the mobile offer application 101, wherein the mobile offer application 101 can be configured to apply optical character recognition (OCR) algorithms to convert a physical receipt into a digital form, which can be ingested and analyzed by the mobile offer platform 160.

As a next operation, the user may identify a rebate that he or she wishes to redeem within the mobile offer application 101. The user may select the rebate and the app can be configured to initiate the process of launching a retailer's application 103 in order to make the purchase (process 123). The retailer's application may be associated with the item that the user wishes to redeem. The mobile offer application may also generate a unique token to identify the launch of the retailer's application. Alternatively or in addition to, the user's selection of the rebate may be configured to initiate the process of launching a retailer interface, such as a web interface (e.g., without launching the retailer's application 103) to otherwise access the retailer servers 111. In some instances, the retailer interface may launch from within the mobile offer application 101. In other instances, the retailer interface may launch external to the mobile offer application 101.

Next, the mobile offer application 101 may be configured to register the launch of the retailer's application (or retailer interface) with the mobile offer platform 160.

As the mobile offer application 101 launches the retailer's application 103, the launch action can utilize a deep link associated with the rebate that the user wishes to redeem. The deep link can be configured to specify the page and/or the location to redirect the user after launching the retailer's application 103. As described elsewhere herein (such as with respect to FIGS. 6A-6B), upon launch of the retailer's application 103, the user may be presented with a retailer application interface comprising an interactive display component (interchangeably referred to as "interactive display" herein) that is updated in response to one or more user actions within the retailer's application 103, such as the selection or manipulation (e.g., add to cart, purchase, etc.) of an item of interest. Alternatively, the launch action can initiate the retailer interface (e.g., mobile web interface). The retailer interface can communicate with the mobile offer application 101 such as to specify the page and/or the location to redirect the user after launching the retailer interface. As described elsewhere herein, upon launch of the retailer interface, the user may be presented with an interactive display component that is updated in response to one or more user actions within the retailer interface, such as the selection or manipulation of an item of interest. The interactive display may be updated in real-time in response to the one or more user actions. The interactive display may present, prior to completion of a final action, such as the purchase or commitment to purchase, a predictive outcome of the final action. For example, the interactive display may present a predicted rebate or credit amount that will result from the purchase of one or more items selected by the user (e.g., added to cart, details viewed, etc.). In another example, the interactive display may present a predicted binary result, such as an indication of success or failure of a desired rebate, reward, or credit goal.

Next, the user may make the purchase on the retailer's mobile application 103 or the retailer interface and the purchase can be registered with the retailer's server systems 111, wherein the retailer's server system 111 can be configured to communicate with the retailer's mobile application 103 or the retailer interface in order to obtain the purchase information (process 124). The retailer application 103 and the retailer servers 111 can form a client-server relationship. The retailer interface and the retailer servers 111 can form a client-server relationship.

Next, the retailer's system 111 can be configured to communicate and report the pending purchase to the mobile offer platform 160 (process 125). The mobile offer platform 160 may be configured to receive such notification and perform offer or rebate matching, including providing any awards or appropriate rebates to the customer.

Next, the retailer may send a purchase finalization to the mobile offer platform 160 (process 127). The mobile offer platform 160 may then finalize the award of the rebate to the customer and credit the customer with the funds. In some embodiments, the mobile offer platform 160 may be configured to communicate with the mobile offer application 101 in order to display one or more information with regards to the rebate, including the amount of rebate, for example. The final amount credited to the customer may match the predicted result presented on the interactive display prior to purchase.

In some instances, the mobile platform environment may include deep linking servers 112 to facilitate the intra-user device 140 communication between the retailer application 103 and the mobile offers application 101, such as during process 123 when the user's selection of a rebate in the mobile offers application 101 initiates the launching of the retailer's application 103 in the user device 140. The components, devices, or systems in the environment (e.g., user device 140, mobile offer platform 160, and retailer servers 111) may be communicatively coupled to the deep linking servers 112 via a network. Each of the retailer application 103 and the mobile offers application 101 may comprise a deep linking node, such as a deep linking software development kit (SDK) (e.g., 104a, 104b), in communication with the deep linking servers 112. Beneficially, the deep linking may allow the mobile offers application 101 to communicate with the retailer application 103 with specificity and/or tailored context. For example, the retailer application 103 may be associated with the item that the user wishes to redeem on the mobile offers application 101. The deep linking servers 112 may generate a unique token to identify the launch of the retailer application 103 (process 128).

While FIG. 1A illustrates the deep linking servers 112 located external to the user device 140, in some instances, one or more servers 112 may reside in the user device 140, such as in memory of the user device 140, to individually and/or collectively facilitate the connections and communications described herein. As an alternative, servers may reside in the user device 140 and external to the user device 140. Alternatively or in addition to, such as when a user communicates the retailer servers 111 without launching the retailer application 103, such as via accessing a retailer interface (e.g., web interface), the mobile offer application 101 and the retailer servers 111 may communicate without deep linking.

Figure 1B:
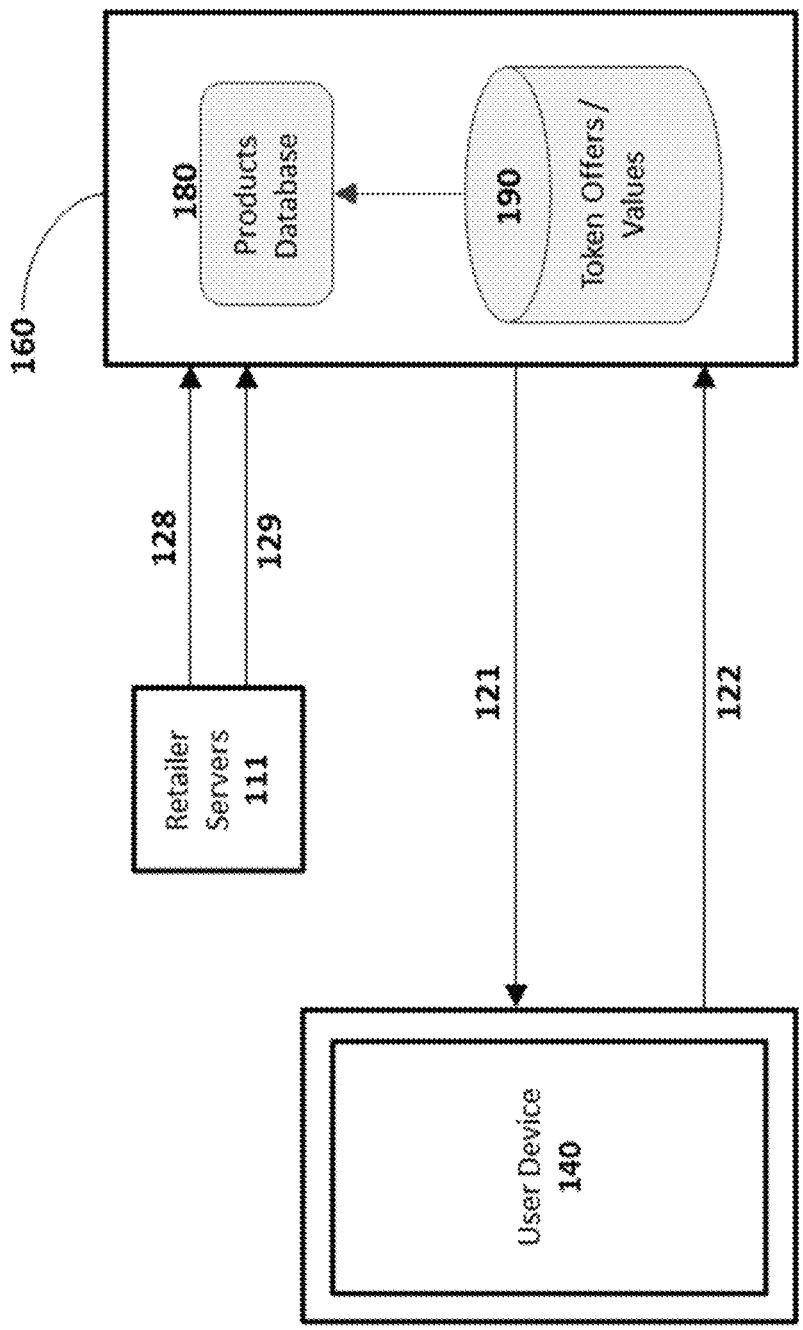
FIG. 1B illustrates an environment for the mobile offer platform configured to ingest third party product database.

FIG. 1B illustrates an environment for the mobile offer platform configured to ingest third party product database. The environment may include a user device 140, mobile offer platform 160, and retailer servers 111. The components, devices, or systems in the environment may be communicatively coupled via a network.

The mobile offer platform 160 may comprise a third party products database 180 and the offers and/or values database 190. The third-party products database 180 may store products and relevant information obtained from retailers or service providers.

The mobile offer platform 160 may be configured to obtain and/or receive product catalog data 128 and retargeting feeds 129 (e.g., user views, clicks, shopping activity, and the like). Such retargeting feeds data can be incorporated into content (e.g., offers and/or rebates) presented to the customer. For example, the user may be presented with a customized offer based on the retargeting feeds data received by the mobile offer platform 160.

The data feeds ingested by the mobile offer platform 160 can include links to the products that the mobile offer application uses when launching one or more other mobile application (i.e., third-party mobile applications). These links may also be referred to as deep links. The deep links can specify which page or product the user views when launching the third-party mobile application (i.e., to the retailer application 103). This can be beneficial for a more efficient transaction since it takes the user directly to the product page within the third-party mobile application (i.e., to the retailer application 103). Alternatively or in addition to, the data feeds ingested by the mobile offer platform 160 can include links to the products that the mobile offer application uses when launching the retailer interface. For example, such links may be hyperlinks or links to an accessible location or address.

The mobile offer platform 160 can also be configured to ingest offline customer purchase data. Offline customer purchase data can provide insight to customer purchase behavior and can enable the mobile offer platform 160 to predict which products the customers are likely to purchase, when they are likely to purchase, where they are likely to purchase, and the like.

The ability to obtain offline purchase data via various methods (e.g., snapshot of the offline purchase receipt, ingesting data from various retailers, etc.) provides a unique benefit for the mobile offer platform 160. The mobile offer platform 160 can combine offline purchase data with the product and retargeting feeds of the retailers and can present relevant online offers to the offline purchasers, thereby enticing them to try online shopping.

While FIGS. 1A-B have been explained with respect to a mobile-based user experience, using a mobile offer platform 160 and a mobile offer application 101, it will be appreciated that the user device may be any user device, such as a desktop computer, operating the computer systems described herein. For example, a user may launch a desktop application (e.g., in a desktop platform), such as a program or browser application, or even a mobile device emulation application, or any other application to achieve the same inter-application process flow between desktop applications (a first application and a second application).

Figure 2:
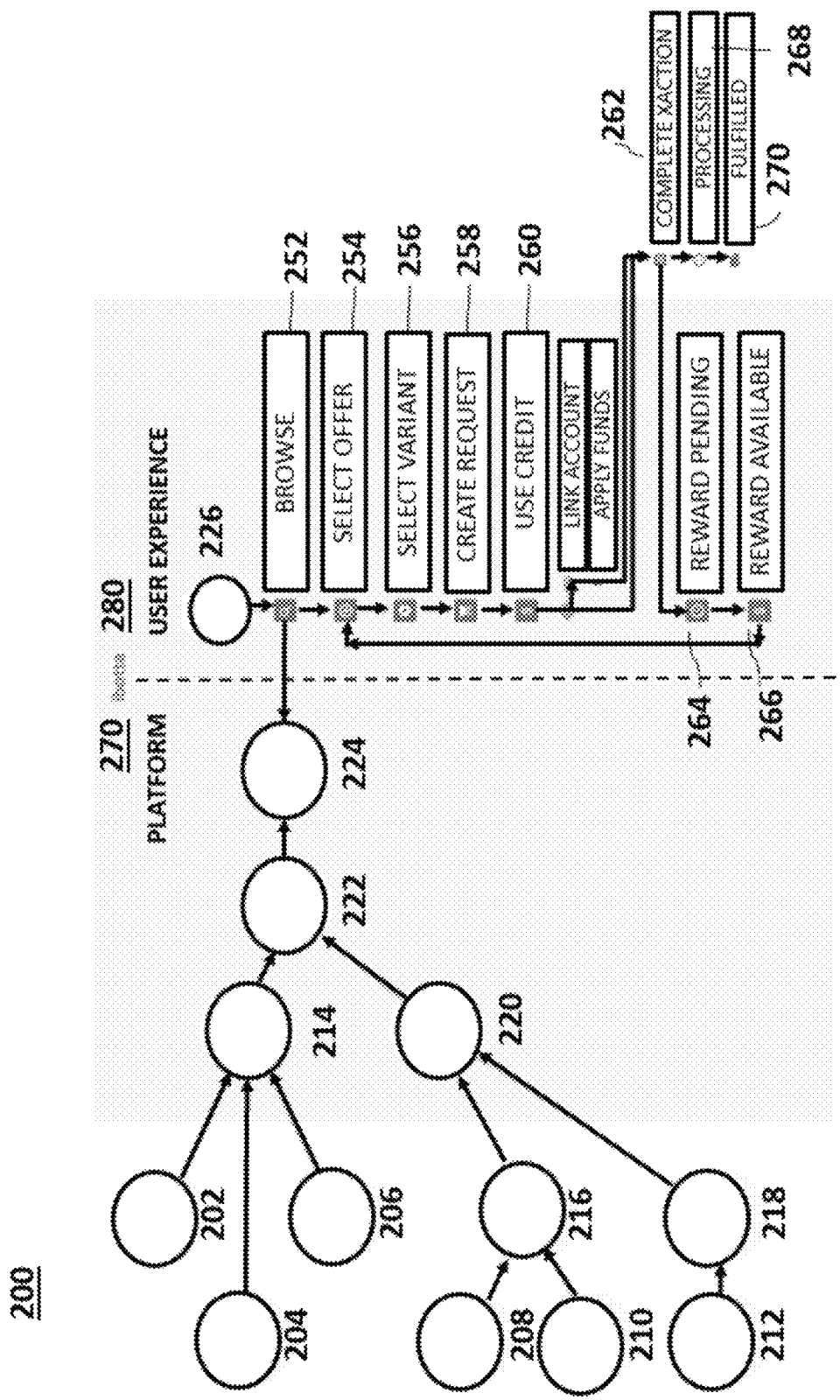
FIG. 2 illustrates a system and method for offer redemption comprising a mobile offer platform.

FIG. 2 illustrates a system 200 for offer redemption comprising a mobile offer platform. The system 200 may be implemented for offer redemption. The system 200 for offer redemption may comprise a mobile offer platform 270. In some embodiments, the mobile offer platform 270 may comprise an interface, such as a graphical user interface (GUI) that provides a user experience 280 for a user 226 using the system 200. An example of an interface is provided in FIGS. 5A-5B, described further below. In some cases, the user may access the user interface through a user device (e.g., user device 140). The user device and various components of the mobile offer platform 270 may be communicatively coupled via a network.

The mobile offer platform 270 may comprise an offers and/or values database 214 and a products and services database 220. The offers and/or values database 214 may receive and store offers and/or values data (e.g., cash back, rewards, incentives, credits, etc.) from different incentive providers, such as service providers 202, retailers 204, and manufacturers 206. The products and services database 220 may receive and store products data 216 (e.g., products catalog data), such as from offline retailers 208 and online retailers 210, and service data 218 (e.g., services catalog data), such as from service providers 212. In some cases, the offers and/or values database 214 and the products and services database 220 may be updated in real-time, such as with the real-time provision of data from one or more providers (e.g., incentive providers, retailers, manufacturers, online retailers, offline retailers, service providers, etc.) of data. While FIG. 2 illustrates two databases, the mobile offer platform 270 may comprise any number of databases that can collectively and/or individually, in any distributed manner, store data relating to offers and/or values, and products and services.

The mobile offer platform 270 may comprise a recommendation system 222 that ingests products and services data, and offers and/or values data to generate an aggregate inventory 224 of content (e.g., offers and/or rebates). Such content may be presented to the user 226, such as on a graphical user interface on the user device. In some embodiments, the mobile offer platform 270 may receive retargeting feeds (e.g., user views, clicks, shopping activity, or the like) to customize a selection of offers (e.g., based on relevance to the user) to present to the user 226.

Through the interface on the user device, the user 226 may browse 252 content (e.g., offers, items associated with offers, etc.) available in the mobile offer platform 270, such as by accessing the aggregate inventory 224. The content presented to the user 226 may or may not be tailored for the user 226. In some instances, the user 226 may browse content that is not customized for the user 226. The user 226 may select 254 one or more offers of interest, and/or items (e.g., products, services, etc.) associated with the offers of interest. Such offers and/or items may be selected from a mobile offer application and/or an application external to the mobile offer platform, such as a retailer application or other retailer interface (e.g., retailer web interface). The user 226 may then select 256 a variant (e.g., color, product type, service duration, or the like) of the items associated with the offers of interest and create 258 an order for the item variants, such as for purchase with the retailers of the item variants. The user 226 may or may not use 260 an amount of available credit available to the user 226. For example, the available credit may be credit accumulated from the user's redemptions of previous offers. The available credit may be financial credit. The user may complete 262 the transaction in a platform external to the mobile offer platform 270, such as in a retailer-provided platform (e.g., in a retailer mobile application 103, in a retailer web interface, etc.) by completing the purchase of the items associated with the offers of interest.

Upon completion of the transaction, the user 226 may be directed back to the mobile offer platform 270, where the rewards or values of the redeemed offer are pending 264 and/or is available 266, or becomes available, for future use (e.g., for a next purchase). For example, the rewards or values of the redeemed offer may mature into available credit that can be used for future purchases. Separately and simultaneously, or near simultaneously, the retailer may process 268 the transaction and confirm fulfilment 270 of the transaction (e.g., shipment of the items purchased).

Figure 3:
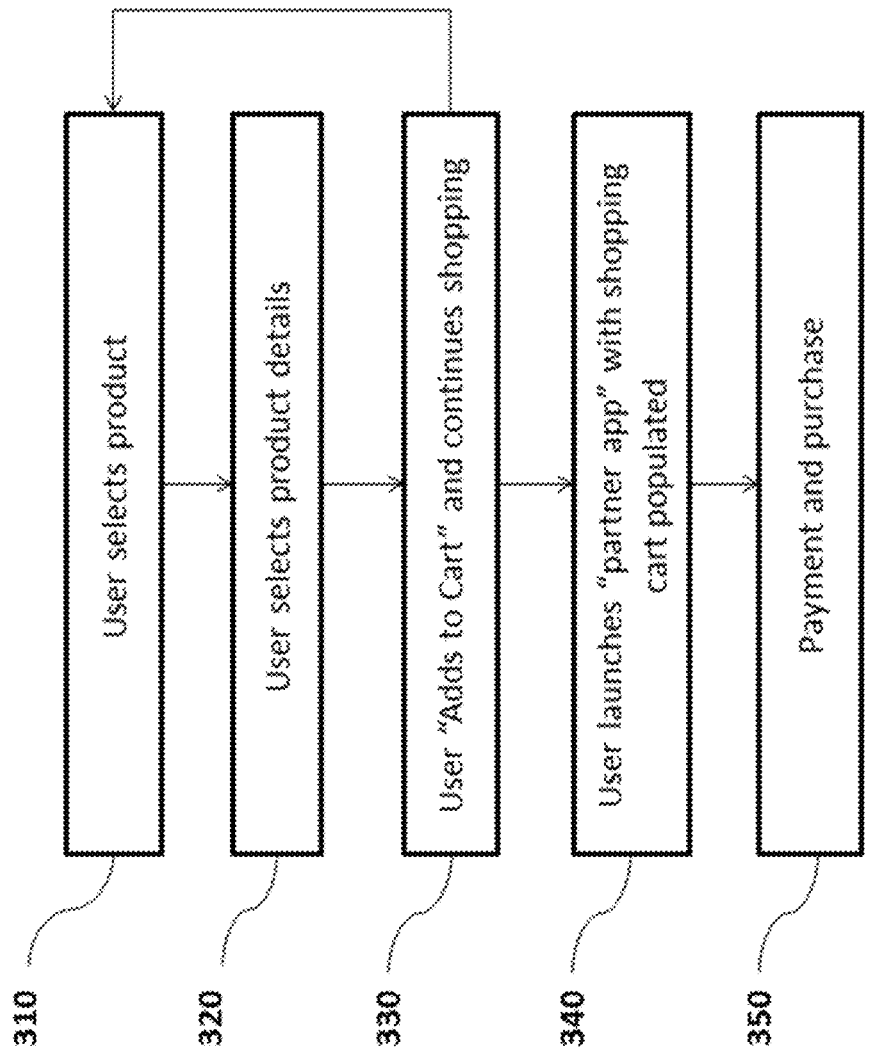
FIG. 3 illustrates a block diagram for a multi-item purchase feature for the mobile offer platform.

FIG. 3 illustrates a block diagram for a multi-item purchase feature for the mobile offer platform and the mobile offer application. In some embodiments, the mobile offer application 101 can be configured to provide multi-item purchase functionality. The mobile offer platform 160 can be configured to ingest content (e.g., product information) from multiple retailers. In some embodiments, the data collected from various retailers can be utilized to provide more relevant content to the users.

The mobile offer application 101 can be configured to request relevant content from the mobile offer platform 160, wherein the mobile offer platform 160 can be configured to transmit the most relevant content based on the user's data stored on the platform 160. The users may be able to purchase the items displayed in the mobile offer application 101 by selecting or clicking on the product of interest (process 310). Once the user clicks or selects the product, the user may further select the variant of the product or service, for example, size of product, color, and the like (process 320). The user may further select an "add to cart" feature and continue shopping (process 330), wherein the "add to cart" feature enables the user to continue shopping within the mobile offer application.

In some embodiments, once the user finishes adding new products into his or her online shopping cart, the mobile offer application 101 can be configured to launch the retailer mobile application with the shopping cart populated on the retailer mobile application (process 340). Alternatively, the mobile offer application 101 can be configured to launch a retailer interface with the shopping cart populated. Next, the user may make payment and the purchase can be finalized (process 350).

In other embodiments, the user may "add to cart" products available from multiple different vendors or retailers, and when the user decides to proceed to "payment," the mobile offer application 101 can be configured to automatically manage the payment of the products in the shopping cart, without the need for the user to launch a separate retailer application or retailer interface, or leave the mobile offer application 101. The mobile offer application 101 can be configured to communicate with the other retailer application 103 or retailer interface, and complete the purchase on each retailer on behalf of the user, for example.

FIG. 4 illustrates a block diagram for payments and offer redemption for the mobile offer platform and the mobile offer application. The mobile offer platform 160 and the mobile offer application 101 can be configured to earn redemptions or cash back, which can be kept inside of the mobile offer platform 160 account until the user may decide to cash out via one or more available mechanisms, including, but not limited to PayPal, peer-to-peer (P2P) mobile payment platforms (e.g., Venmo), Gift Cards, direct deposit, payment for a purchase, and the like, or a combination thereof.

In other embodiments, the users may be able to directly apply earnings accumulated through the mobile offer platform 160 towards the purchase price of products or services. For example, the users may be able to purchase items displayed in the mobile offer application 101 by selecting or clicking on the product of interest (process 410). Once the user clicks or selects the product, the user may further select the variant of the product or service, for example, size of product, color, and the like (process 420). The user may further select "add to cart" feature and continue shopping (process 430), wherein the "add to cart" feature enables users to continue shopping within the mobile offer application 101 after adding the selected product into an online shopping cart of the mobile offer application 101. Once the user finishes adding new products into his or her online shopping cart, the mobile offer application 101 can be configured to launch the retailer mobile application or retailer interface. This can be initiated, for example, by the user selecting "purchase" within the mobile offer application 101, wherein the mobile offer application 101 can be configured to apply available credit amount to the total value of the products in the shopping cart (process 435). Next, the retailer mobile application (e.g., retailer application 103) or retailer interface can be launched with the shopping cart on the retailer application or retailer interface populated with the products that the user had selected in the mobile offer application 101 (process 440). Next, the user may make payment and the purchase can be finalized, wherein the payment amount is adjusted based on the available credit amount on the mobile offer application 101 (process 450). Alternatively or in addition, the user may make payment and the purchase can be finalized using a method of payment stored in the mobile offer application 101, such as applying funds from a debit or credit card stored in the mobile offer application 101.

In some embodiments, the mobile offer application 101 can be configured to enable the user to purchase one or more products or items directly from within the mobile offer application, without launching the retailer mobile application 103 or retailer interface. The mobile offer application can include a shopping cart, and the user may make payment and the purchase can be finalized on the mobile offer application 101 without launching the retailer mobile application 103 or retailer interface.

In some embodiments, the user may select an offer from the mobile offer application 101 without selecting a specific item or product associated with the offer, and the retailer mobile application (e.g., retailer application 103) or retailer interface (e.g., web interface) for the retailer associated with the offer may be launched such that the user can manually populate the cart of the retailer within the retailer application or retailer interface. Such cart may be populated with one or more items that may or may not be associated with the selected offer. In some instances, the user interface may present an interactive display to the user that is updated in real-time with predicted outcomes of the user's selection. The predicted outcomes may relate to the applicability of the selected offer to the user's selection of the one or more items in the retailer application or retailer interface. In some instances, such predicted outcomes may be a numerical value, such as a rebate, credit, or reward amount from the offer. In some instances, such predicted outcomes may be a binary success or failure indicator of the applicability of the offer. The interactive display may be updated in real-time in response to the user's actions within the retailer application or retailer interface. In some instances, the interactive display may respond to particular user actions, such as to not respond to a navigating or browsing action but respond to an 'add to cart' action.

In some embodiments, the user may launch the retailer mobile application or retailer interface from the mobile offer application without selection of any offer, and the user's actions within the retailer application or retailer interface may be tracked or monitored. Based on the available offers in the mobile offer platform, and the user's actions, the mobile offer application may recommend or prompt selection of one or more offers to the user. In some instances, the mobile offer platform may automatically apply one or more offers. In some instances, the user interface may present an interactive display to the user that is updated in real-time with predicted outcomes of the user's selection. The predicted outcomes may relate to a recommended, prompted, or automatically applied offer, such as to display to a user, prior to purchase (or other final action), a predicted reward. In some instances, the interactive display may allow a user to select (or apply) an offer directly from the interactive display (e.g., via a user interactive object, such as a button) without departing the retailer application or retailer interface. In some instances, the interactive display may allow a user to return to the mobile offer application to select the recommended or prompted offer and return to the retailer application or retailer interface with the selected offer.

Graphical User Interface for Deep-Linking Communication

Figure 5A:
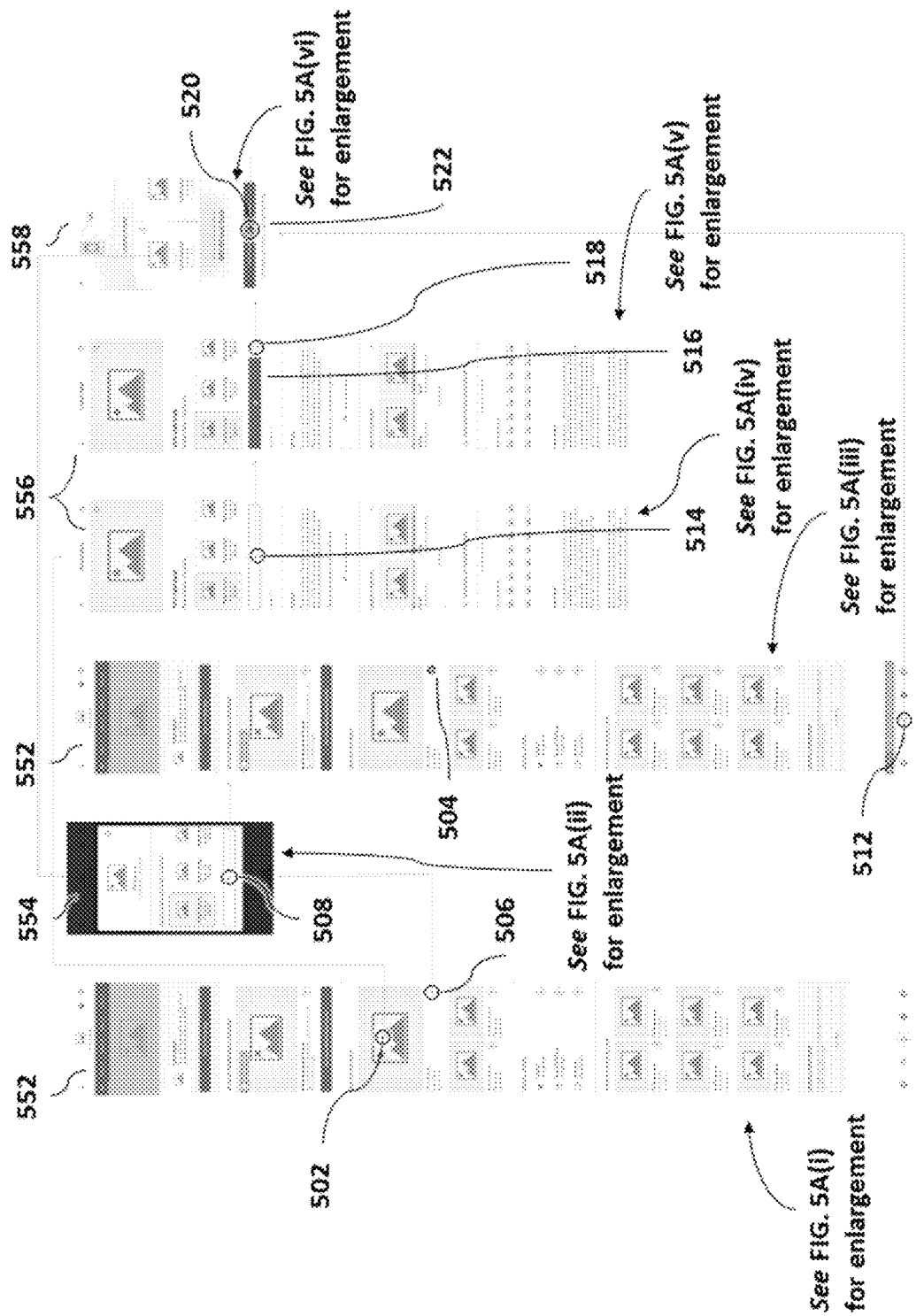
FIGS. 5A-5B illustrate an interface workflow for redeeming an offer.
Figure 5B:
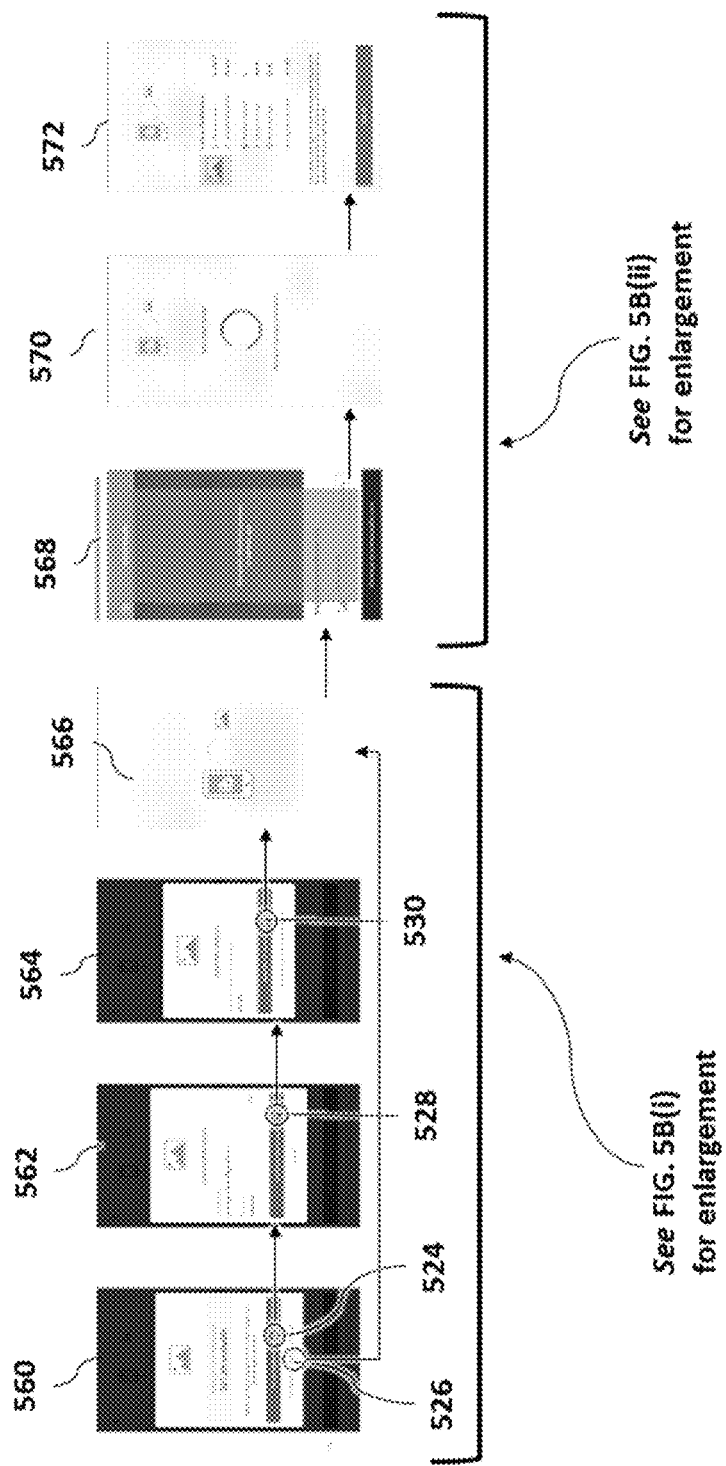
Figure 5A:
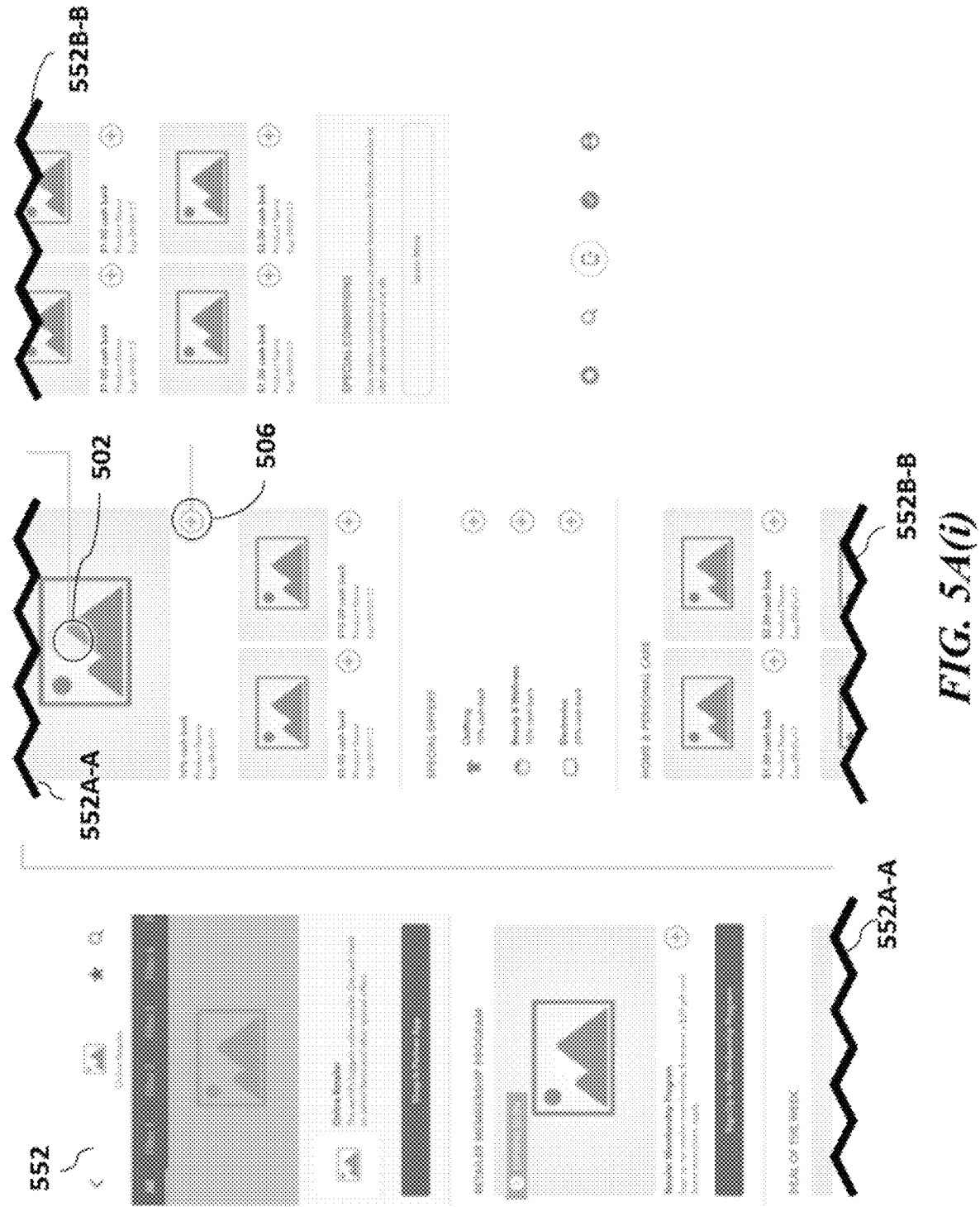
Figure 5A:
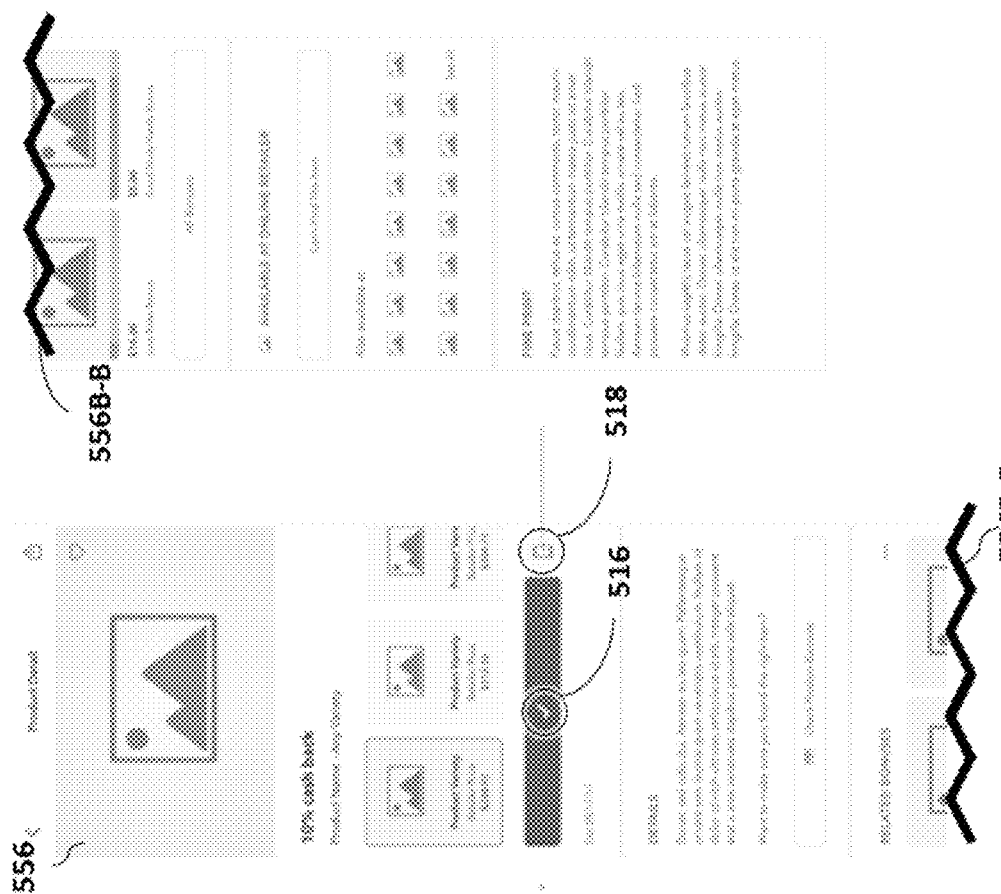
Figure 5B:
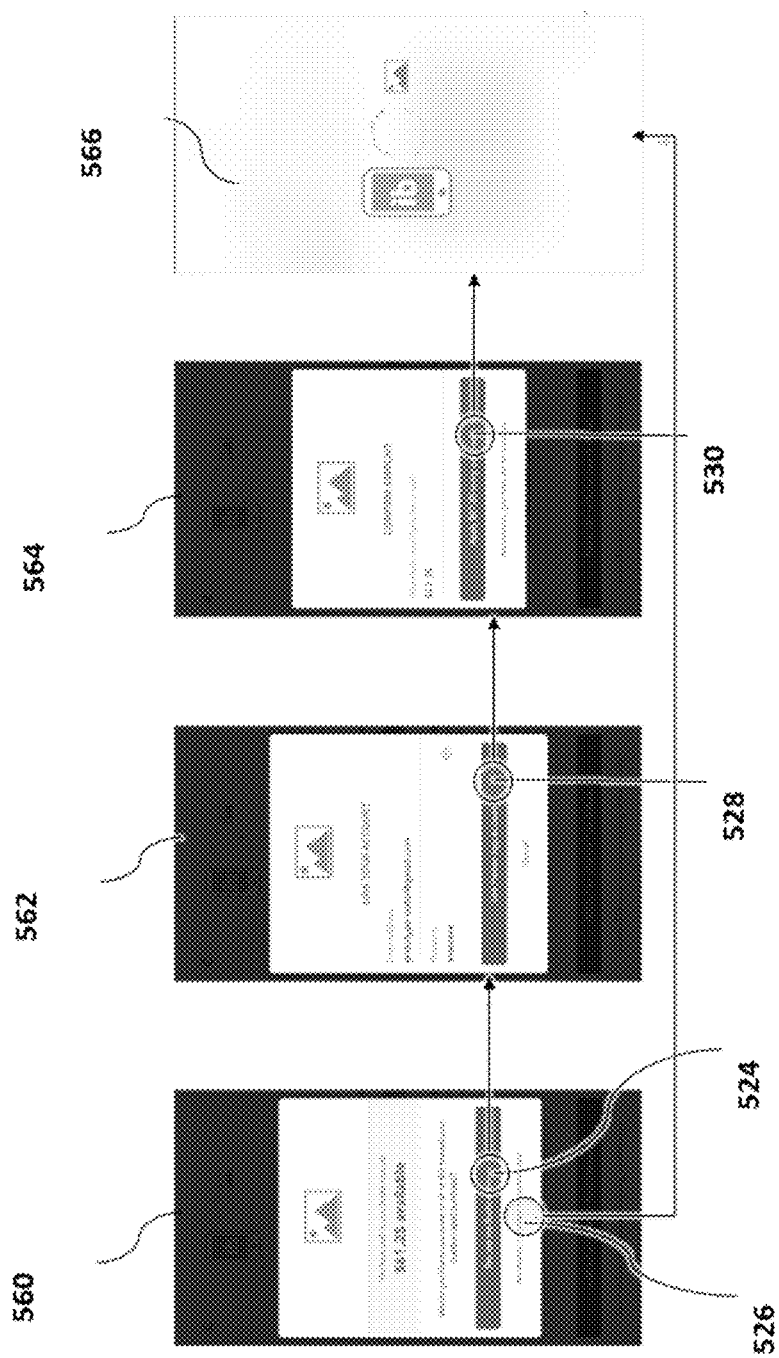

FIGS. 5A-5B illustrate an interface workflow for redeeming an offer. In some embodiments, the mobile offer application 101 can be configured to, at a first interface page 552, provide the user with a plurality of offers. For example, each offer may be displayed as an individual graphical representation. The plurality of offers may involve, or predicate, the purchase of one or more items from a plurality of retailers. For example, an item may be a product and/or a service. An offer may be associated with one or more items (and/or purchase thereof). An offer may be associated with one or more retailers (and/or retailer mobile applications or retailer interfaces thereof). In some instances, the mobile offer application 101 can be configured to request relevant content (e.g., a selection of offers) from the mobile offer platform 160, and the mobile offer platform 160 can be configured to transmit the relevant content based on the user's data stored on the platform 160 to the mobile offer application 101 for display to the user, such as on the first interface page 552.

The user may be able to redeem an offer displayed in the first interface page 552 by selecting or clicking on an offer of interest, such as by selecting or clicking an 'add' feature 506 associated with the offer of interest. For example, selection of the 'add' feature 506 may direct the user to a second interface page 554, where the user may be presented with one or more variants of one or more items associated with the offer of interest, such as size of a product, color, duration of a service, or the like. The second interface page 554 may or may not be a pop-up page or a floating window. The user may select an 'add to cart' feature 508 associated with a variant of the item on the second interface page 554. Upon selection of the 'add to cart' feature 508, the mobile offer application 101 may store the item (variant) selection, such as to a virtual cart, and the user may be directed back to the first interface page 554, such as for continued shopping of the plurality of offers displayed on the first interface page 554. On the first interface page 554, the 'add' feature 506 for the offer of interest may now display as an 'added' feature 504 to indicate that the user has added the offer of interest to the virtual cart.

In some embodiments, the user may also be provided with details about an item or offer by clicking on an image 502 associated with the offer of interest from the first interface page 552. The selection of the image 502 may direct the user to a third interface page 556, where the user may be presented with detailed information about the item and/or offer of interest. For example, such detailed information may comprise one or more images and/or text description about the item and/or offer to allow the user to make an informed selection. The third interface page 556 may also provide the user with one or more variants of the item associated with the offer of interest, such as size of a product, color, duration of a service, or the like. The user may select an 'add to cart' feature 514 associated with a variant of the item to confirm the item (variant) selection, such as to a virtual cart. Upon selection of the 'add to cart' feature 514, the mobile offer application 101 may store the item (variant) selection, and the 'add to cart' feature 514 may now display as an 'added' feature 516 on the third interface page 556 to indicate to the user that the offer of interest has been added to the virtual cart.

In some embodiments, once the user finishes adding one or more offers of interest and/or items associated with the offers of interest into the virtual cart, the mobile offer application 101 can be configured to launch the retailer interface (e.g., the retailer mobile application 103 via deep linking, retailer web interface) with the shopping cart in the retailer interface populated with the user's selection of the retailer's items (associated with one or more offers of interest stored in the virtual cart) selected by the user in the mobile offer application 101. For example, the user may select from the first interface page 552 a 'link to retailer' feature 512, or select from the third interface page 556, a 'link to retailer' feature 518 to launch the retailer interface. In some instances, the 'link to retailer' feature 518 in the third interface page 556 may only become available for selection once an item (variant) selection from the third user interface page 556 has been added to the virtual cart. Upon selection of the 'link to retailer' feature (e.g., 512, 518), the user may be directed to a fourth interface page 558.

The fourth interface page 558 may allow a user to launch the retailer interface (e.g., a web interface page, retail mobile application, etc.) with the shopping cart in the retailer interface populated with the user's selection of the retailer's items (associated with one or more offers of interest stored in the virtual cart) selected by the user in the mobile offer application 101, such as by selecting an 'add to cart in retailer application' feature 520. Alternatively, the user may launch the retailer interface without populating the shopping cart in the retailer interface, such as by selecting a 'no thanks' feature 522. For example, with this selection, the user may manually populate the shopping cart of the retailer interface with products of interest in the retailer interface, which may or may not include the items associated with the offers of interest. The fourth interface page 558 may display all the offers of interest the user has saved to the virtual cart in the mobile offer application 101. In some instances, the fourth interface page 558 may display an amount to be received if all offers of interest are redeemed (e.g., by purchasing the one or more items associated with the offers of interest with the retailer interface).

Upon selection of the 'add to cart in retailer application' feature 520 in the fourth interface page 558, the user may be directed to a fifth interface page 560. The fifth interface page 560 may or may not be a pop-up page or a floating window. The fifth interface page 560 may display a credit amount available for the user in the mobile offer application 101. The fifth interface page 560 may allow the user to apply the available credit amount to the purchase of the one or more items associated with the offers of interest saved in the virtual cart during payment to a retailer in the retailer interface, such as by choosing an 'apply credit' feature 524. Alternatively, the user may choose not to apply the credit in the retailer interface, such as by choosing a 'no thanks' feature 526.

Upon selection of the 'apply credit' feature 524 in the fifth interface page 560, the user may be directed to a sixth interface page 562. The sixth interface page 562 may or may not be a pop-up page or a floating window. The sixth interface page 562 may request user credentials to link the user account in the retailer interface with the user account in the mobile offer application 101, such as by selecting a 'link retailer application account' feature 528 after inputting the correct user credentials (e.g., identification or user name, password, etc.).

Upon selection of the 'link retailer application account' feature 528 in the sixth interface page 562, the user may be directed to a seventh interface page 564. The seventh interface page 564 may or may not be a pop-up page or a floating window. The seventh interface page 564 may allow the user to select a specific amount of credit to apply from a total amount of available credit. For example, the maximum amount that the user may input may be the total amount of available credit. The user may confirm the amount of credit to be applied by selecting an 'apply credit to purchase' feature 530.

Upon selection of the 'apply credit to purchase' feature 530 in the seventh interface page 564, the user may be directed to an eighth interface page 566. The eighth interface page 566 may be an inter-application transition graphic, such as during loading and/or launch of the retailer interface. After the eighth interface page 566, the user may be automatically directed to a ninth interface page 568. Alternatively or in addition, the user may be directed directly to the ninth interface page 568 from the seventh interface page 564.

The ninth interface page 568 may display an interface of the retailer interface (e.g., an interface of the retailer mobile application 103, an interface of the retailer web interface, etc.). In some embodiments, the retailer interface may have a virtual cart that has been pre-populated with the user's selections from the mobile offer application 101 upon launching. The user may proceed to make payment on the pre-populated virtual cart in the retailer interface. Alternatively or in addition, the user may manually add one or more other items (e.g., not associated with an offer in the mobile offer application 101) to the virtual cart in the retailer interface.

Figure 6A:
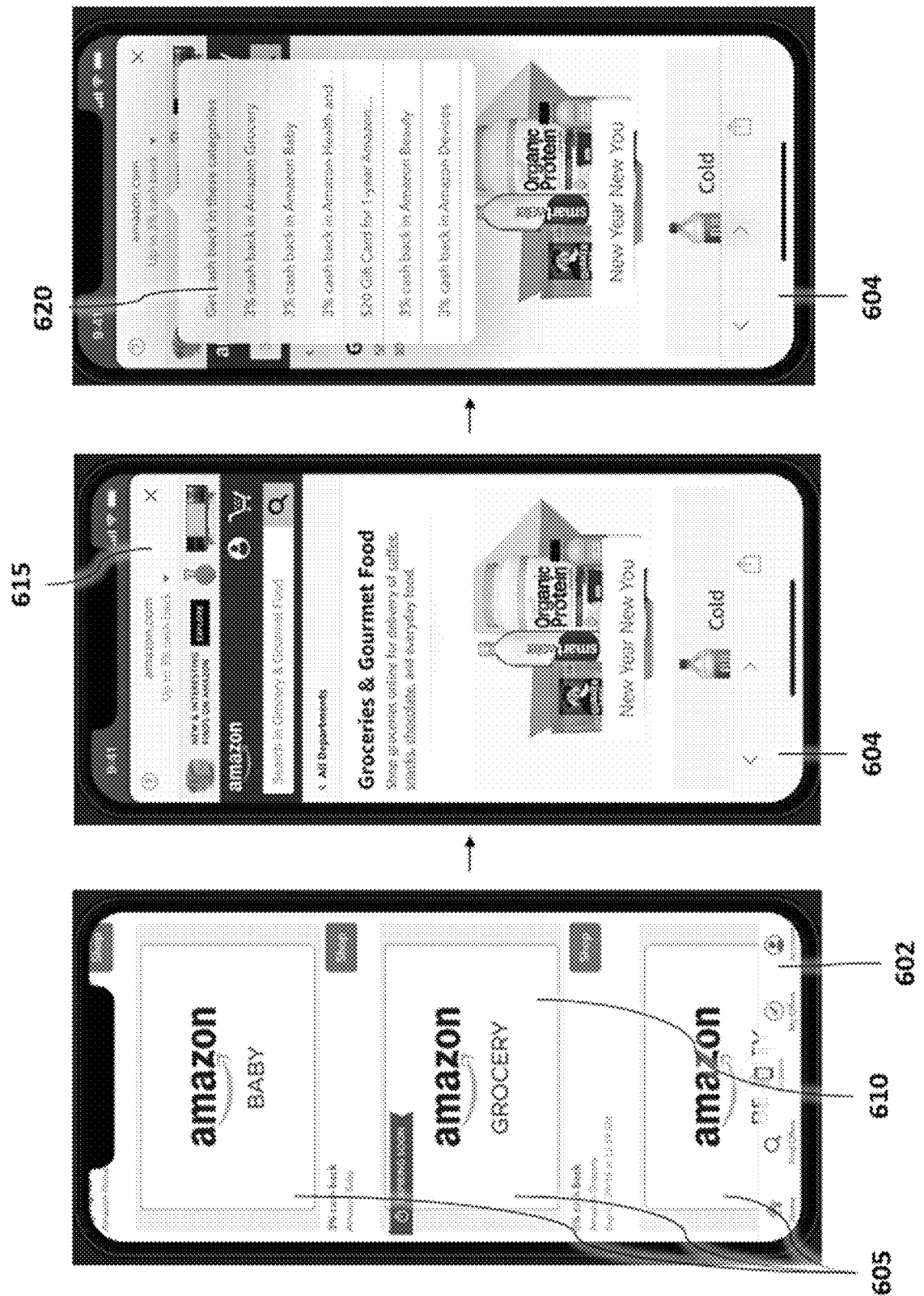
FIGS. 6A-6B illustrate an interface workflow for an interactive display presenting predicted outcomes for user actions in an external application.
Figure 6B:
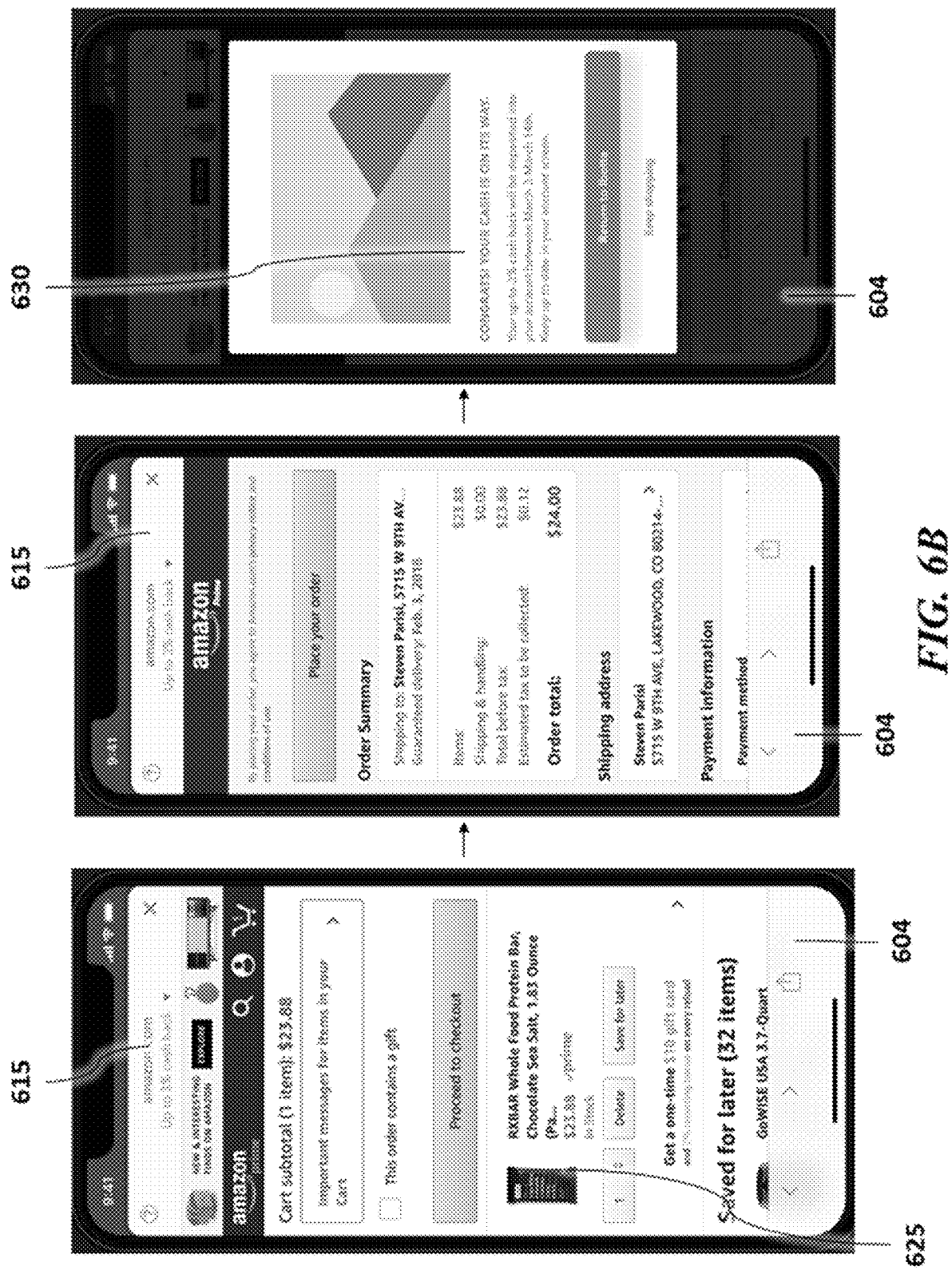

In some instances, as described with respect to FIGS. 6A-6B, the retailer interface may present an interactive display to the user that is updated in real-time with predicted outcomes of the user's actions. The predicted outcomes may relate to the applicability of the one or more offers of interest to the populated virtual cart, whether automatically pre-populated or manually populated, in the retailer interface. In some instances, such predicted outcomes may be a numerical value, such as a rebate, credit, or reward amount from the offers of interest. In some instances, such predicted outcomes may be a binary success or failure indicator of the applicability of the offers of interest to the populated virtual cart. The interactive display may be updated in real-time in response to the user's actions within the retailer interface. In some instances, the interactive display may respond to particular user actions, such as to not respond to a navigating or browsing action but respond to an 'add to cart' action. In some instances, the interactive display may be updated upon visiting a specific interface page of the retailer interface (e.g., virtual cart page, checkout page, order summary page, etc.). In some instances, the interactive display may be visible at all times during launch of the retailer interface, such as in the form of a status or notification bar in the header, footer, side-bar, corner-bar, floating window, pop-up, background, or other display. In some instances, the interactive display may be visible upon request or call-out by the user.

Beneficially, the user may be provided with instantaneous, or near instantaneous, confirmation of offer redemption prior to actual purchase, or commitment to purchase. Beneficially, the user may be provided with instantaneous, or near instantaneous, confirmation of offer redemption as applied to each item of interest. For example, such confirmation may be provided to users within minutes, seconds, or less time as the interactive display is updated.

In some embodiments, the retailer interface may have instructions to apply credit from the mobile offer application 101 to the purchase of one or more items in the virtual cart of the retailer interface, such as the amount the user input in the seventh interface page 564. The user's credit in the mobile offer application 101 may be applied such as via intermediate purchase of a gift card in the retailer interface (e.g., with the retailer server) by the mobile offer application 101 in the amount of the credit to be applied (e.g., purchase amount or less), and applying such intermediate purchase of the gift card to the purchase amount. In some instances, the intermediate gift card may be performed automatically without user input (beyond selecting the option to "apply credit). In some instances, the user may not be made aware of the intermediate gift card transaction.

In some embodiments, the retailer interface may allow the user to select the method of payment from one or more methods of payment stored in the mobile offer application 101 (e.g., credit cards, debit cards, electronic check, etc.). Alternatively or in addition, the retailer interface may allow the user to select an option to apply credit from the mobile offer application 101 (e.g., applied via the intermediate gift card transaction). Alternatively or in addition, the retailer interface may allow the user to select an additional offer for the method of payment that offers additional rebates, cashback, or rebate to the user, such as in the form of an instant gift card. The instant gift card may offer a discount between the quoted price of the items in the virtual cart by the retailer interface and purchase price of the instant gift card. In some instances, the additional offer may be offered by the retailer interface as a result of the retailer interface detecting the mobile offer application 101, such as via the deep linking servers (e.g., 112). In some instances, the additional offer may be offered by the mobile offer application, such as by detecting a checkout screen of the retailer interface. The user may or may not be directed back to the mobile offer application 101 to select the instant gift card offer.

After the user has finished the payment process in the retailer interface, the user may be directed back to the mobile offer application 101, such as to a tenth interface page 570. The tenth interface page 570 may be a transition graphic displayed to the user, such as during the time the mobile offer application 101 confirms the user's purchases with the retailer interface. After confirmation, the user may be directed to an eleventh interface page 572. The eleventh interface page 572 may display to the user a notification of purchase confirmation with the retailer interface. The eleventh interface page 572 may provide the user with information such as, date of purchase, number of offers confirmed for the purchase, total amount of credit redeemed for the offers matched, average pending period for credit redeemed for offers of interest.

Beneficially, the user may be provided with instantaneous, or near instantaneous, confirmation of offer redemption from time of purchase of an item associated with an offer, where the purchase is made in an external retailer interface, to time of offer redemption or confirmation of offer redemption in the mobile offer application. For example, such confirmation may be provided to users within minutes, seconds, or less time. As will be appreciated, such confirmation may be limited by a server communication time between the mobile offer application 101 and the retailer servers 111. Alternatively or in addition, such confirmation may be streamlined by the mobile offer application 101 recognizing an authorized purchase action made on the retailer interface (e.g., that can only lead to a purchase) to confirm the purchase. Additionally, the user may at all times, from display of available offers, to selection of offers of interest, to selection of items associated with offers of interest, to payment of items with a retailer interface, to confirmation of purchase at the retailer interface, and to confirmation of offer redemption, be displayed, or otherwise be made aware of, the user's redemption status on an offer of interest with the mobile offer application 101. The transition from the mobile offer application to the retailer interface, and immediate return transition from the retailer interface to the mobile offer application may allow the mobile offer application 101 to provide immediate acknowledgement to a user that an offer has been successfully completed, and obviate the frustrations of users whose purchases of items associated with an offer are not acknowledged by an offer-providing vendor until days or months after the purchase has been made.

In other embodiments, the user may 'add to cart' products available from multiple different vendors or retailers, and when the user decides to proceed to payment, the mobile offer application 101 can be configured to automatically manage the payment of the products in the shopping cart, without the need for the user to launch a separate retailer interface or leave the mobile offer application 101. The mobile offer application 101 can be configured to communicate with the other retailer interface, and complete the purchase on each retailer on behalf of the user, for example.

FIGS. 6A-6B illustrate an interface for an interactive display presenting predicted outcomes for user actions in an external application. A mobile offer platform application interface 602 may display a plurality of available offers 605. For example, each offer may be displayed as an individual graphical representation. In some instances, the plurality of offers may be organized into groups, such as into retailer group, and/or a user may apply a retail-specific filter such as to display a plurality of offers from a specific retailer. The plurality of offers may involve, or predicate, the purchase of one or more items from a plurality of retailers. For example, an item may be a product and/or a service. An offer may be associated with one or more items (and/or purchase thereof). An offer may be associated with one or more retailers (and/or retailer mobile applications or retailer interfaces (e.g., web interfaces) thereof).

The user may be able to redeem an offer 610 displayed in the mobile offer platform application interface 602 by selecting or clicking on an offer of interest, such as by selecting or clicking an 'add' feature associated with the offer of interest. For example, selection of the 'add' feature may direct the user to a second interface page in the mobile offer application (not shown), where the user may be presented with one or more variants of one or more items associated with the offer of interest, such as size of a product, color, duration of a service, or the like. The user may add the variant of the item, such as to a virtual cart, from such interface page.

Alternatively, or in addition, as shown in FIG. 6A, the user may select the offer 610 from the mobile offer application without selecting a specific item or product associated with the offer, and launch the retailer interface (e.g., retailer application 103, retailer web interface, etc.) for the retailer associated with the offer 610 to display a retailer application interface 604 (e.g., retailer application interface, retailer web interface), such as by selecting a 'shop' feature from the mobile application interface 602. The user's actions within the retailer interface may be tracked or monitored by the mobile offer platform. The user may manually populate the cart of the retailer within the retailer application interface 604. Such cart may be populated with one or more items that may or may not be associated with the selected offer 610. The retailer application interface 604 may present an interactive display 615 to the user. In some instances, the interactive display 615 may be visible to the user at all times during launch of the retailer interface, such as a status or notification bar in the header of the retailer application interface 604 (as shown in FIG. 6A). Alternatively, or in addition, the interactive display 615 may be displayed in the footer, side-bar, corner-bar, floating window, pop-up, background, or other location or other methods of display. In other instances, the interactive display may be visible upon request or call-out by the user.

The interactive display 615 may display a predicted outcome of the user's action. The predicted outcomes may relate to the applicability of the offer 610 to the user's selection of the one or more items in the retailer interface. For example, in some instances, such predicted outcomes may recite the details of the offer 610 ("up to 3% cash back"). In some instances, such predicted outcomes may be a numerical value, such as a rebate, credit, or reward amount that is expected to be awarded to the user if the user completes a final action such as a purchase ("up to $14.25 cash back"). In some instances, such predicted outcomes may be a binary success or failure indicator of the applicability of the offer ("success"/"failure"; "this offer applies to your selection"/"this offer does not apply to your selection"). The predicted outcomes may be particularly beneficial where a plurality of offers is applicable to a plurality of items. For example, the user may be informed of whether two or more separate offers may be applied to a single purchase of an item where one or more offers disallow simultaneous activation (e.g., stacking) of offers. In another example, the user may be informed of whether an offer applicable to a group, category, or department of items is applicable to a particular item for which it is unclear the particular item is part of the group, category, or department of items. In another example, the user may be informed of a total amount of predicted credit amount where a plurality of offers are being applied to a plurality of items.

In some embodiments, the interactive display 615 may display a list 620 of available offers applicable for the retailer of the retailer interface. Such list may be provided as a drop-down menu. In some embodiments, the interactive display 615 may display a list of all available offers applicable or actually applied to the user's selection of one or more offers in the retailer application interface 604. Such list may be provided as a drop-down menu. In some embodiments, the mobile offer application may recommend or prompt selection of one or more offers to the user by displaying the recommended one or more offers in the interactive display 615. In some embodiments, the mobile offer platform may automatically apply one or more offers based on the user's selection of items in the retailer application interface 604. In some instances, such automatic application of one or more offers may be displayed in the interactive display 615. In some instances, the interactive display may allow a user to select (or apply) an offer directly from the interactive display (e.g., via a user interactive object, such as a button) without departing the retailer application interface 604. In some instances, the interactive display may allow a user to return to the mobile offer application interface 602 to select the recommended or prompted offer and return to the retailer application interface 604 with the selected offer.

In some instances, the interactive display may be updated in real-time with the predicted outcomes in response to the user's actions within the retailer interface. The predicted outcomes may relate to the selected offer 610. The predicted outcomes may relate to a recommended, prompted, or automatically applied offer. The predicted outcomes may relate to a cumulative outcome of a plurality of offers (selected by the user or otherwise applied or applicable to the user). In some instances, the interactive display may respond to particular user actions, such as to not respond to a navigating or browsing action but respond to an 'add to cart' action. In some instances, the interactive display may be updated upon visiting a specific interface page of the retailer interface (e.g., virtual cart page, checkout page, order summary page, etc.).

Beneficially, the user may be provided with instantaneous, or near instantaneous, confirmation of offer applicability prior to actual purchase, or commitment to purchase. For example, such confirmation may be provided to users within minutes, seconds, or less time as the interactive display is updated.

Referring to FIG. 6B, after browsing, the user may add an item 625 to a virtual cart in the retail application interface 604. The interactive display 615 may be updated in real-time in response to such adding to the virtual cart, such as to display an amount to be awarded (e.g., "up to $14.25 cash back") as soon as the item 625 is added to the virtual cart. Upon purchasing or committing to purchase, and after the user has finished the payment process, the user may be presented with a notification of purchase confirmation in the retailer application interface 604. The user may be further presented with a redemption confirmation page 630 in the retailer application interface 604 and/or in the mobile offer application interface 602. The redemption confirmation page 630 may provide the user with information such as, date of purchase, number of offers confirmed for the purchase, total amount of credit redeemed for the offers matched, average pending period for credit redeemed for offer 610, and/or other information relating to the offer or redemption thereof. In some instances, the redemption confirmation page 630 may be presented to the user immediately after purchase confirmation. In some instances, the redemption confirmation page 630 may be presented to the user within at most about 5 minutes, 4 minutes, 3 minutes, 2 minutes, 1 minute, 30 seconds, 20 seconds, 10 seconds, 9 seconds, 8 seconds, 7 seconds, 6 seconds, 5 seconds, 4 seconds, 3 seconds, 2 seconds, 1 second, 0.1 seconds, 0.01 seconds or less.

Beneficially, the user may be provided with instantaneous, or near instantaneous, confirmation of offer redemption from time of purchase, where the purchase is made in an external retailer mobile application, to time of offer redemption or confirmation of offer redemption in the mobile offer application.

Beneficially, the user may at all times, from display of available offers, to selection of offers of interest, to selection of items associated with offers of interest in the retailer interface, to payment of items with a retailer interface, to confirmation of purchase at the retailer interface, and to confirmation of offer redemption, be displayed, or otherwise be made aware of, the user's redemption status on an offer of interest with the mobile offer application via the interactive display 615 and/or the redemption confirmation page 630.

While examples and embodiments of the present disclosure may have been explained with respect to a mobile-based user experience, such as using a mobile device, mobile platform, and/or mobile applications, it will be appreciated that the user device may be any user device, such as a desktop computer, operating the systems and methods described herein. For example, a user may launch a desktop application, such as a program or browser application, a mobile device emulation application, or any other application to achieve the same inter-application process flow between desktop applications (a first application and a second application).

Figure 8:
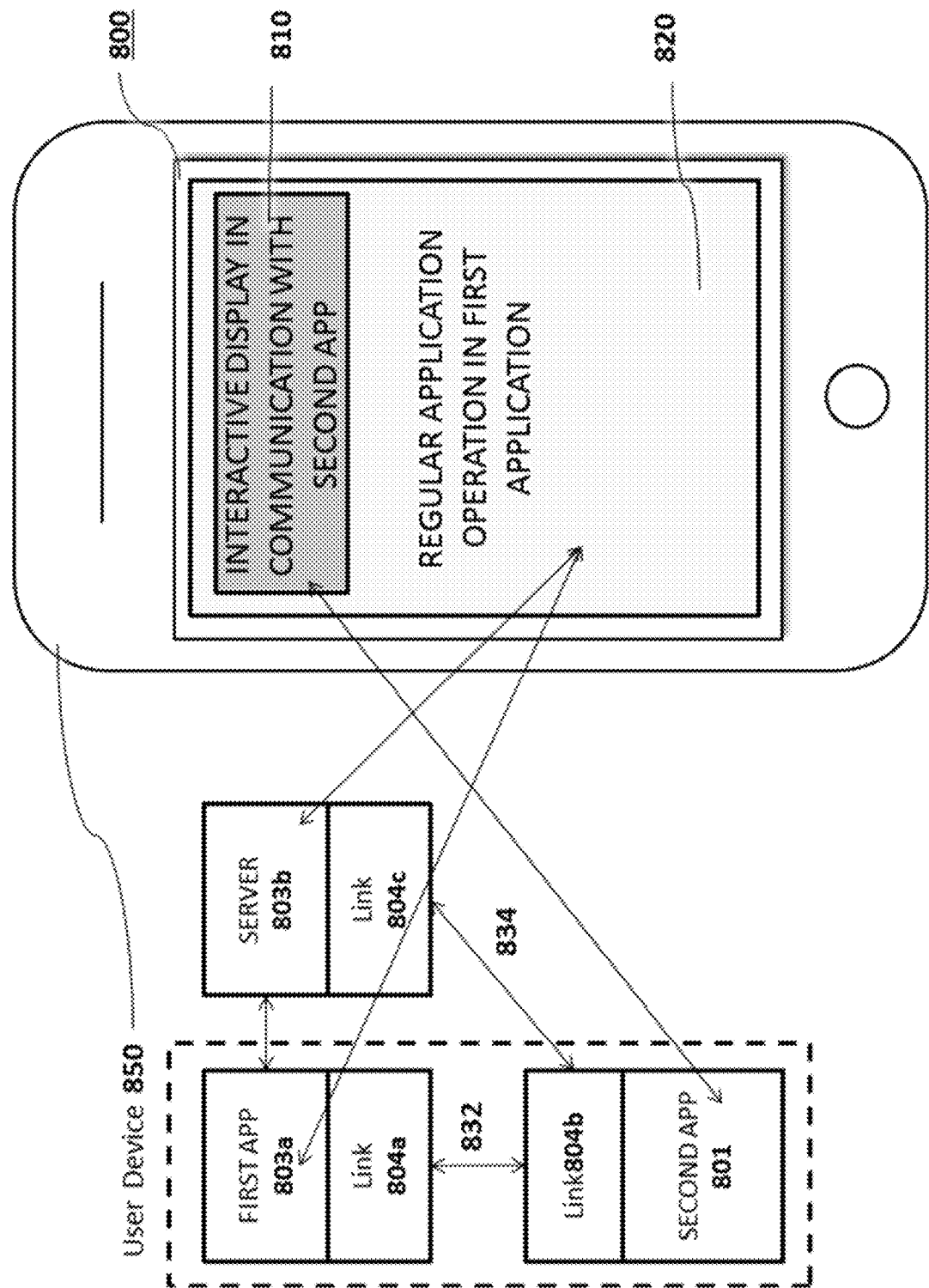
FIG. 8 illustrates a process flow for a dynamic graphical user interface.

FIG. 8 illustrates a process flow for a dynamic graphical user interface. A user device 850 may present a user interface 800 for presenting (i) an interface 820 (e.g., application interface, web-based interface, mobile interface, desktop interface, etc.) of a target entity and (ii) an interactive display 810 which is in communication with a second application 801. The interface 820 may be an application interface provided by a first application 803a of the target entity. Alternatively, the interface 820 may be a web-based interface provided by a server 803b of the target entity. The interface 820 may be any interface provided by the target entity.

In some instances, the first application 803a (e.g., retailer application) can be launched from the second application 801 (e.g., mobile offer application) to provide interface 820 (e.g., application interface). As the second application 801 launches the first application 803a, the launch action can utilize an inter-application communication link 832, such as a deep link via links 804a, 804b, between the two applications. The inter-application communication link 832 can be configured to specify the page and/or the location to redirect the user after launching the application interface of the first application 803a. Alternatively, the launch action can initiate another interface (e.g., mobile web interface) of the target entity. The interface can communicate with the second application 801 via link 834 (e.g., via links 804b, 804c) such as to specify the page and/or the location to redirect the user after launching the interface.

In some instances, the launching action may be associated with a distinct objective in the second application 801 (e.g., redemption of a rebate in the mobile offer application). Upon launch, the user may be presented with the interface 820 of the target entity and an interactive display 810. The interactive display 810 can be updated in response to one or more user actions within the interface 820, such as the selection or manipulation (e.g., add to cart, purchase, etc.) of an item of interest with the target entity. The interactive display 810 may be updated in real-time in response to the one or more user actions, such as to display a status or output of the distinct objective in the second application 801. Alternatively or additionally, the interactive display 810 may display possible objectives that may be achieved, based on the user actions.

For example, the interactive display may present, prior to completion of a final action performed in the interface 820, such as the purchase or commitment to purchase, a predictive outcome of the final action in the second application 801 with respect to a particular objective (e.g., particular offer) or a possible objective (e.g., previously uncontemplated by the user). In an example, the interactive display 810 may present a predicted rebate or credit amount that will result from the purchase of one or more items selected by the user (e.g., added to cart, details viewed, etc.). In another example, the interactive display 810 may present a predicted binary result, such as an indication of success or failure of a desired rebate, reward, or credit goal.

Beneficially, the interactive display 810 may be visible during regular operation of the interface 820 without having to terminate, suspend, or otherwise delay operation in the first application 803a (or in the web-based interface or other interfaces). The interactive display 810 may be displayed throughout a user experience of the interface 820, such that the user is always aware of a consequence of a user action in the second application 801 as well as possible objectives the user may achieve in the second application 801 through activity in the interface 820 which is external to the second application 801.

Computer Control Systems

Figure 7:
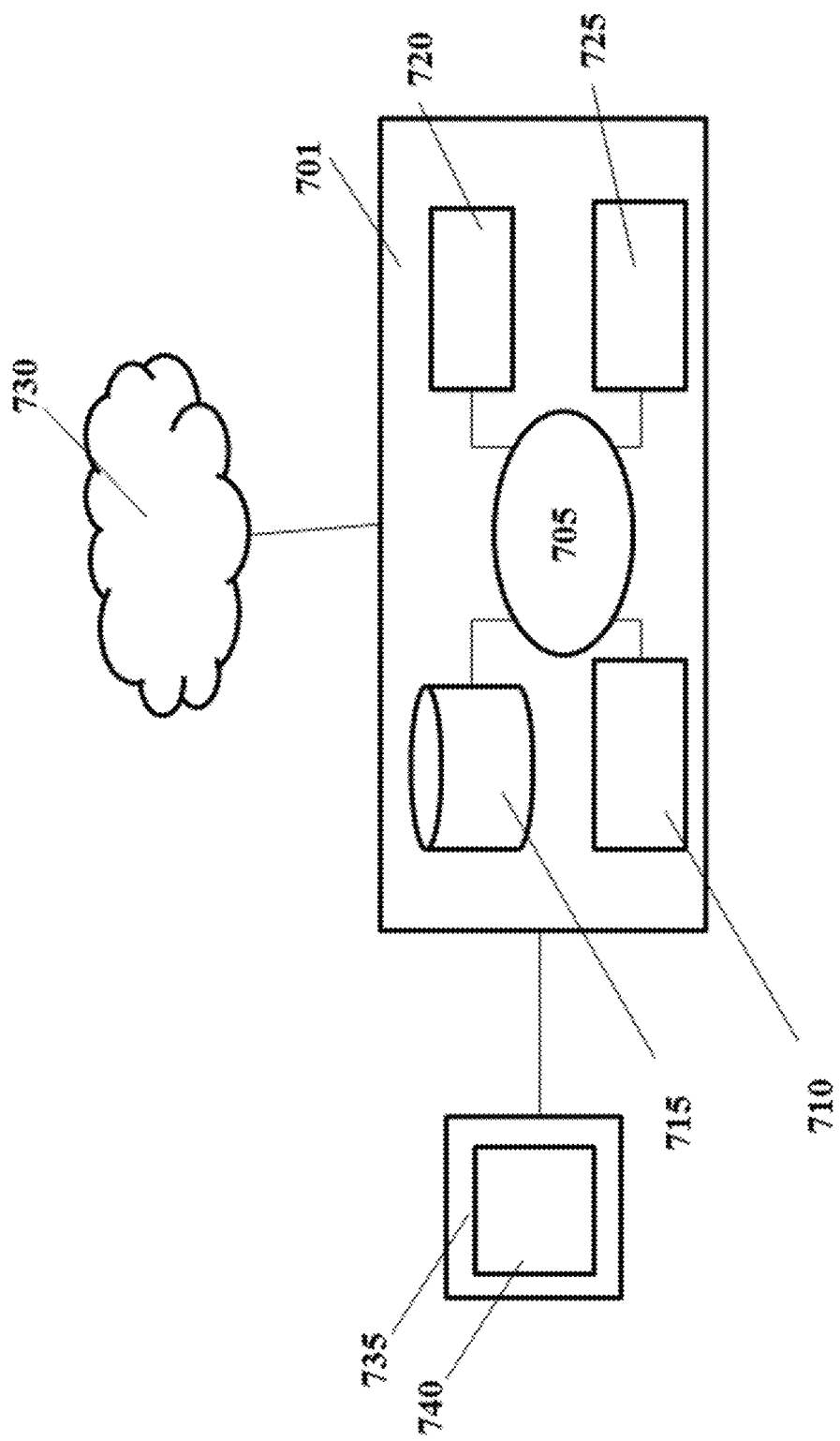
FIG. 7 illustrates an example of a computer architecture applicable to any computer system discussed herein.

The present disclosure provides computer control systems that are programmed to implement methods of the disclosure. FIG. 7 shows a computer system 701 that is programmed or otherwise configured to provide rebate or credit to customers based on their purchase activity. The computer system 701 can regulate various aspects of FIGS. 1A-B and FIG. 2 of the present disclosure, such as, for example, mobile offer platform 160, mobile application platform 101, user devices 140, flow chart illustrated in FIG. 3 and FIG. 4, and work flows illustrated in FIGS. 5A-5B and 6A-6B.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., mobile device, smartphone, tablet). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, display of customized offers and redemptions based on dynamic segmentation (as disclosed herein), product information, product links, payment information, redemption or rebate amount, shopping cart items, available credit amount, and other related information. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, provide highly customized offers and rebates to users based on dynamic segmentation, track purchases across multiple different applications, automatically credit offers and redemptions based on purchases, and implement the processes illustrated in FIGS. 1-4, 5A-5B and 6A-6B.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computing device configured to display on a user interface of a mobile user device, a dynamic graphical user interface, the dynamic graphical user interface displaying simultaneously:

a web-based interface of a retailer mobile application for receiving one or more user actions on the web-based interface, the retailer mobile application launched from a coupon mobile application via an inter-mobile application communication link between the retailer mobile application and the coupon mobile application, wherein the retailer mobile application and the coupon mobile application are both mobile applications of the mobile user device; and an interactive display in communication with the coupon mobile application, wherein the coupon mobile application is different from and capable of launching external to the retailer mobile application, wherein the interactive display presents to a user a plurality of interactive coupon units, wherein a value associated, respectively, with the plurality of interactive coupon units is adjusted based on user information, wherein the coupon mobile application is configured to receive a first user action and generate a token in response to the first user action, wherein the first user action indicates a user interest to an interactive coupon unit associated with the retailer mobile application, wherein the coupon mobile application launches the retailer mobile application containing the interactive coupon unit via the inter-mobile application communication link, and redirects the retailer mobile application to cause the retailer mobile application to present a page containing the interactive coupon unit based on the token, wherein the interactive display of the coupon mobile application dynamically presents, in real-time, a status or output of the coupon mobile application in response to the one or more user actions performed on the web-based interface, wherein one of the one or more user actions initiates a transaction, and wherein the interactive display is visible during performance of the one or more user actions on the web-based interface, and wherein the coupon mobile application is configured to complete the transaction for the retailer mobile application without departing from the coupon mobile application.

2. The computing device of claim 1, wherein the status or output comprises a predicted outcome of the one or more user actions in the coupon mobile application.

3. The computing device of claim 1, wherein the status or output comprises a list of options in the coupon mobile application available for user selection.

4. The computing device of claim 3, wherein user selection of a given option from the list of options in the interactive display of the coupon mobile application translates to user selection of the given option in the coupon mobile application without departing the web-based interface of the retailer mobile application.

5. The computing device of claim 1, wherein the interactive display of the coupon mobile application is visible prior to or subsequent to performance of the one or more user actions on the web-based interface of the retailer mobile application.

6. The computing device of claim 5, wherein the interactive display of the coupon mobile application is visible at all times during launch of the web-based interface of the retailer mobile application.

7. The computing device of claim 1, wherein the status or output presented in the interactive display of the coupon mobile application updates, in real-time, in response to a first subset of user actions performed in the web-based interface and does not update in response to a second subset of user actions performed in the web-based interface.

8. The computing device of claim 1, wherein the interactive display of the coupon mobile application is presented as a header in the web-based interface of the retailer mobile application.

9. The computing device of claim 1, wherein the interactive display of the coupon mobile application is presented as a floating window or pop-up in the web-based interface of the retailer mobile application.

10. The computing device of claim 1, wherein the interactive display is communicatively linked to the coupon mobile application via an external server providing the interactive display.

11. A computing device configured to display on a user interface of a mobile user device, a dynamic graphical user interface, the dynamic graphical user interface displaying simultaneously:
    an application interface of a first mobile application for receiving one or more user actions on the application interface, the first mobile application launched from a second mobile application via an inter-mobile application communication link between the first mobile application and the second mobile application, wherein the first mobile application and the second mobile application are both mobile applications of the mobile user device; and
    an interactive display in communication with the second mobile application, wherein the second mobile application is different from and capable of launching external to the first mobile application, wherein the interactive display presents to a user a plurality of interactive coupon units, wherein a value associated, respectively, with the plurality of interactive coupon units is adjusted based on user information, wherein the second mobile application is configured to receive a first user action and generate a token in response to the first user action, wherein the first user action indicates a user interest to an interaction coupon unit associated with the first mobile application, wherein the coupon mobile application launches the first mobile application containing the interactive coupon unit via the inter-mobile application communication link, and redirects the first mobile application to a page presenting the interactive coupon unit based on the token,
    wherein the interactive display presents, in real-time, a status or output of the second mobile application in response to the one or more user actions, wherein one of the one or more user actions initiates a transaction, and wherein the interactive display is visible during performance of the one or more user actions on the application interface, and
    wherein the second mobile application is configured to complete the transaction for the first mobile application without departing from the second mobile application.

12. The computing device of claim 11, wherein the status or output comprises a predicted outcome of the one or more user actions in the second mobile application.

13. The computing device of claim 11, wherein the status or output comprises a list of options in the second mobile application available for user selection.

14. The computing device of claim 13, user selection of a given option from the list of options in the interactive display of the second mobile application translates to user selection of the given option in the second mobile application without departing the application interface of the first mobile application.

15. The computing device of claim 11, wherein the interactive display of the second mobile application is visible prior to or subsequent to performance of the one or more user actions on the application interface of the first mobile application.

16. The computing device of claim 15, wherein the interactive display of the second mobile application is visible at all times during launch of the application interface of the first mobile application.

17. The computing device of claim 11, wherein the status or output presented in the interactive display of the second mobile application updates, in real-time, in response to a first subset of user actions performed in the application interface and does not update in response to a second subset of user actions performed in the application interface.

18. The computing device of claim 11, wherein the interactive display of the second mobile application is presented as a header in the application interface of the first mobile application.

19. The computing device of claim 11, wherein the interactive display of the second mobile application is presented as a floating window or pop-up in the application interface of the first mobile application.

20. The computing device of claim 11, wherein the first mobile application is communicatively linked to the second mobile application via deep linking.

* * * * *